(12) United States Patent
Han et al.

(10) Patent No.: US 11,643,768 B2
(45) Date of Patent: May 9, 2023

(54) WIRELESS SENSING DEVICE AND DRYER

(71) Applicant: Samsung Electronics Co., Ltd., Suwon-si (KR)

(72) Inventors: Jeong Su Han, Suwon-si (KR); Do Yoon Kim, Suwon-si (KR); Tae Gyoon Noh, Suwon-si (KR); Jun Hoe Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 297 days.

(21) Appl. No.: 16/946,505

(22) Filed: Jun. 24, 2020

(65) Prior Publication Data

US 2020/0407903 A1 Dec. 31, 2020

(30) Foreign Application Priority Data

Jun. 25, 2019 (KR) .......................... 10-2019-0075563

(51) Int. Cl.
*D06F 34/05* (2020.01)
*D06F 34/06* (2020.01)
(Continued)

(52) U.S. Cl.
CPC .............. *D06F 34/05* (2020.02); *D06F 34/06* (2020.02); *D06F 34/10* (2020.02); *D06F 34/18* (2020.02);
(Continued)

(58) Field of Classification Search
CPC .. D06F 34/18; D06F 2103/04; D06F 2105/12; D06F 2105/56
See application file for complete search history.

(56) References Cited

U.S. PATENT DOCUMENTS 5,301,523 A * 4/1994 Payne ..................... D06F 33/48
318/368
5,561,991 A * 10/1996 Berkcan .................. D06F 34/18
73/779
(Continued)

FOREIGN PATENT DOCUMENTS

DE 1031981 A1 4/1992
DE 102016216265 A1 3/2018
(Continued)

OTHER PUBLICATIONS

WO2018086871A1 Machine Translation (Year: 2018).*
(Continued)

*Primary Examiner* — Spencer E. Bell

(57) ABSTRACT

A wireless sensing device disposed a drum along with laundry to measure humidity in the drum, thereby increasing accuracy in estimation of a degree of dryness, a dryer for determining a degree of dryness of the laundry using the wireless sensing device, and a method of controlling the dryer. The wireless sensing device includes a sensing module including a humidity sensor for measuring humidity in a drum of a dryer into which the wireless sensing module is thrown; a sensor communication module transmitting or receiving data with a main communication module of the dryer through wireless communication; a sensor controller configured to control the sensor communication module to transmit a humidity value corresponding to an output of the sensing module to the main communication module; and a sensor power supplier supplying power to the sensing module, the sensor communication module, and the sensor controller.

13 Claims, 19 Drawing Sheets

(51) Int. Cl.
  *D06F 34/10* (2020.01)
  *D06F 58/48* (2020.01)
  *D06F 34/18* (2020.01)
  *D06F 58/38* (2020.01)
  *D06F 34/26* (2020.01)
  *D06F 58/46* (2020.01)
  *D06F 58/36* (2020.01)
  *H02J 50/00* (2016.01)
  *H02J 50/10* (2016.01)
  *H02J 50/15* (2016.01)
  *D06F 103/34* (2020.01)
  *D06F 105/12* (2020.01)
  *D06F 103/04* (2020.01)
  *D06F 105/58* (2020.01)

(52) U.S. Cl.
  CPC .............. *D06F 34/26* (2020.02); *D06F 58/36* (2020.02); *D06F 58/38* (2020.02); *D06F 58/46* (2020.02); *D06F 58/48* (2020.02); *H02J 50/001* (2020.01); *H02J 50/10* (2016.02); *H02J 50/15* (2016.02); *D06F 2103/04* (2020.02); *D06F 2103/34* (2020.02); *D06F 2105/12* (2020.02); *D06F 2105/58* (2020.02)

(56) References Cited

U.S. PATENT DOCUMENTS

| | | |
|---|---|---|
| 9,518,354 B2 | 12/2016 | Kulkarni et al. |
| 9,951,465 B1 | 4/2018 | Herschler et al. |
| 2010/0000267 A1* | 1/2010 | Leidig ................. D06F 35/007 68/23 R |
| 2011/0057123 A1* | 3/2011 | Ho ....................... H02J 50/005 320/108 |
| 2011/0067185 A1* | 3/2011 | Koo ...................... D06F 33/40 68/139 |
| 2012/0246835 A1* | 10/2012 | Ashrafzadeh ........... D06F 34/16 68/23.2 |
| 2016/0160431 A1* | 6/2016 | Lee ........................ D06F 58/20 34/499 |
| 2017/0037563 A1 | 2/2017 | Kulkarni |
| 2018/0112349 A1* | 4/2018 | Herschler .............. D06F 34/04 |
| 2019/0330792 A1* | 10/2019 | Del Maschio .......... D06F 34/18 |

FOREIGN PATENT DOCUMENTS

| | | |
|---|---|---|
| KR | 10-2016-0065225 A | 6/2016 |
| WO | 2015127995 A1 | 9/2015 |
| WO | 2018086871 A1 | 5/2018 |

OTHER PUBLICATIONS

European Search Report dated Oct. 29, 2020 in connection with European Application No. 20181496.9, 10 pages.

Communication under Rule 71(3) EPC dated Dec. 15, 2022 in connection with European Patent Application No. 20 181 496.9, 61 pages.

* cited by examiner

LARGE LOAD OF LAUNDRY

SMALL LOAD OF LAUNDRY

WIRELESS SENSING DEVICE AND DRYER

CROSS-REFERENCE TO RELATED APPLICATION

This application is based on and claims priority under 35 U.S.C. § 119 to Korean Patent Application No. 10-2019-0075563 filed on Jun. 25, 2019, the disclosure of which is incorporated herein by reference in its entirety.

BACKGROUND

1. Field

The disclosure relates to a wireless sensing device used in a dryer that dries the laundry, e.g., clothes, a dryer having the wireless sensing device, and a method of controlling the dryer.

2. Discussion of Related Art

A dryer is a device for drying laundry, such as garments, towels, bedclothes, etc., by supplying hot air into its drum containing the laundry while rotating the drum.

A drying course for the laundry may be performed for a time set in advance, determined depending on original weight of the laundry, or initially selected by the user.

However, when the drying time is fixed as mentioned above, the drying course proceeds regardless of an actual degree of dryness of the laundry, so the drying course continues unnecessarily even after the laundry is already dried out or otherwise finished even when the laundry is not yet dried.

Hence, a technology to determine a drying completion time by measuring a degree of dryness of the laundry during the drying course has recently been developed, but the technology is still less accurate in measuring the degree of dryness.

SUMMARY

The disclosure provides a wireless sensing device thrown into a drum along with laundry to measure humidity in the drum, thereby increasing accuracy in estimation of a degree of dryness, a dryer for determining a degree of dryness of the laundry using the wireless sensing device, and a method of controlling the dryer.

The disclosure also provides a wireless sensing device powering itself by having an energy harvesting technology applied to kinetic energy generated when the wireless sensing device thrown into a drum along with laundry is rotated along with the drum.

The disclosure also provides a wireless sensing device thrown into a drum along with laundry to measure acceleration while being rotated along with the drum, a dryer for determining a load of laundry using the acceleration measured by the wireless sensing device, and a method of controlling the dryer.

According to an embodiment of the disclosure, a wireless sensing device includes a sensing module including a humidity sensor for measuring humidity in a drum of a dryer into which the wireless sensing module is thrown; a sensor communication module transmitting or receiving data with a main communication module of the dryer through wireless communication; a sensor controller configured to control the sensor communication module to transmit a humidity value corresponding to an output of the sensing module to the main communication module; and a sensor power supplier supplying power to the sensing module, the sensor communication module, and the sensor controller.

The sensor power supplier may include an energy generation module generating electric energy using energy harvesting; and an energy storage module storing the electric energy.

The energy generation module may use at least one of an electromagnetic induction method, a triboelectrification method, piezoelectric method, or thermoelectric method to generate electric energy.

The energy generation module may use kinetic energy of the wireless sensing device rotating, free falling or tumbling in the rotating drum to generate electric energy.

The energy generation module may include a coil, and a magnet movable around the coil due to rotation of the drum, and the energy generation module may store electromotive force generated when the magnet is moving inside the coil as the wireless sensing device rotates, free-falls, or tumbles due to rotation of the drum.

The energy generation module may convert thermal energy of hot air supplied into the drum to electric energy.

The sensing module may include an acceleration sensor, and the sensor controller may control the sensor communication module to transmit an acceleration value corresponding to an output of the acceleration sensor to the main communication module of the dryer.

The wireless sensing device may include a main body accompanying the sensing module, the sensor controller, the sensor communication module, and the sensor power supplier, and the main body may include at least one opening.

The wireless sensing device may include a first plate and a second plate to divide the inside of the main body, and the humidity sensor may be arranged in a space between the first and second plates; air in the drum may be brought into the main body through the opening; a flow path in which the air brought in flows may be defined by a space between the second plate and an inner wall of the main body.

A hole through which the air flowing in the flow path is brought in may be formed in an area on the second plate facing the humidity sensor, and the wireless sensing device may further include a moisture passing filter arranged across the hole for passing moisture and filtering out foreign materials.

The wireless sensing device may further include a printed circuit board (PCB) circuit arranged in a space between the first plate and the second plate, and a heat shielding wall arranged between the humidity sensor and the PCB circuit.

According to an embodiment of the disclosure, a dryer includes a drum; a wireless sensing device comprising a sensing module including a humidity sensor for measuring humidity in the drum, a sensor communication module transmitting or receiving data through wireless communication, a sensor controller configured to control the sensor communication module to transmit a humidity value corresponding to an output of the humidity sensor, and a sensor power supplier supplying power to the sensing module, the sensor communication module, and the sensor controller; a main communication module receiving the humidity value from the wireless sensing device thrown into the drum; and a main controller configured to determine that drying is completed when the humidity value is equal to or less than a set threshold.

The sensing module may include an acceleration sensor, and the sensor controller may control the sensor communication module to transmit an acceleration value corresponding to an output of the acceleration sensor.

The main controller may determine a load of laundry contained in the drum based on the acceleration value.

The dryer may further include a display, and the main controller may determine initial expected time taken to complete drying of the laundry based on the load of the laundry and control the display to display the initial expected time.

The main controller may set a different threshold for each load of the laundry.

The main controller may determine remaining time of drying based on a current humidity value received from the wireless sensing device and the set threshold, and control the display to display the remaining time of drying.

The main controller may determine whether the laundry contained in the drum is entangled based on the acceleration value, and when it is determined that the laundry is entangled, perform a laundry disentanglement course.

The main controller may determine that the laundry is entangled when an amount of change in the acceleration value is reduced by a set threshold or more.

The main controller may perform the laundry disentanglement course by repeating changing at least one of rotation speed or rotation direction of the drum.

The sensor power supplier may use kinetic energy of the wireless sensing device rotating, free falling or tumbling in the rotating drum to generate electric energy.

The main controller may determine a load of laundry contained in the drum based on an amount of the electric energy generated.

The main controller may determine whether the laundry contained in the drum is entangled based on an amount of the electric energy generated.

According to an embodiment of the disclosure, a method of controlling a dryer includes generating electric energy using kinetic energy of a wireless sensing device thrown into a drum of the dryer when the drum is rotated; supplying power to a sensing module of the wireless sensing device using the electric energy; measuring, by the sensing module, humidity in the drum; and transmitting a humidity value corresponding to an output of the sensing module to a main communication module of the dryer.

The generating of the electric energy may include using at least one of an electromagnetic induction method, a triboelectrification method, piezoelectric method, or thermoelectric method to generate electric energy.

The method may further include determining that drying is completed when the humidity value is equal to or less than the set threshold.

The method may further include measuring, by the sensing module, acceleration; and transmitting an acceleration value corresponding to an output of the sensing module to the main communication module.

The method may further include determining a load of laundry contained in the drum based on the acceleration value.

The method may further include determine initial expected time taken to complete drying of the laundry based on the load of the laundry and displaying the initial expected time on a display.

The method may further include setting a different threshold for each load of the laundry.

The method may further include determining remaining time of drying based on a current humidity value transmitted from the wireless sensing device and a set threshold; and displaying the remaining time of drying on a display.

The method may further include determining whether the laundry contained in the drum is entangled based on the acceleration value; and performing a laundry disentanglement course when it is determined that the laundry is entangled.

The determining of whether the laundry is entangled may include determining that the laundry is entangled when an amount of change in the acceleration value is reduced by a set threshold or more.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
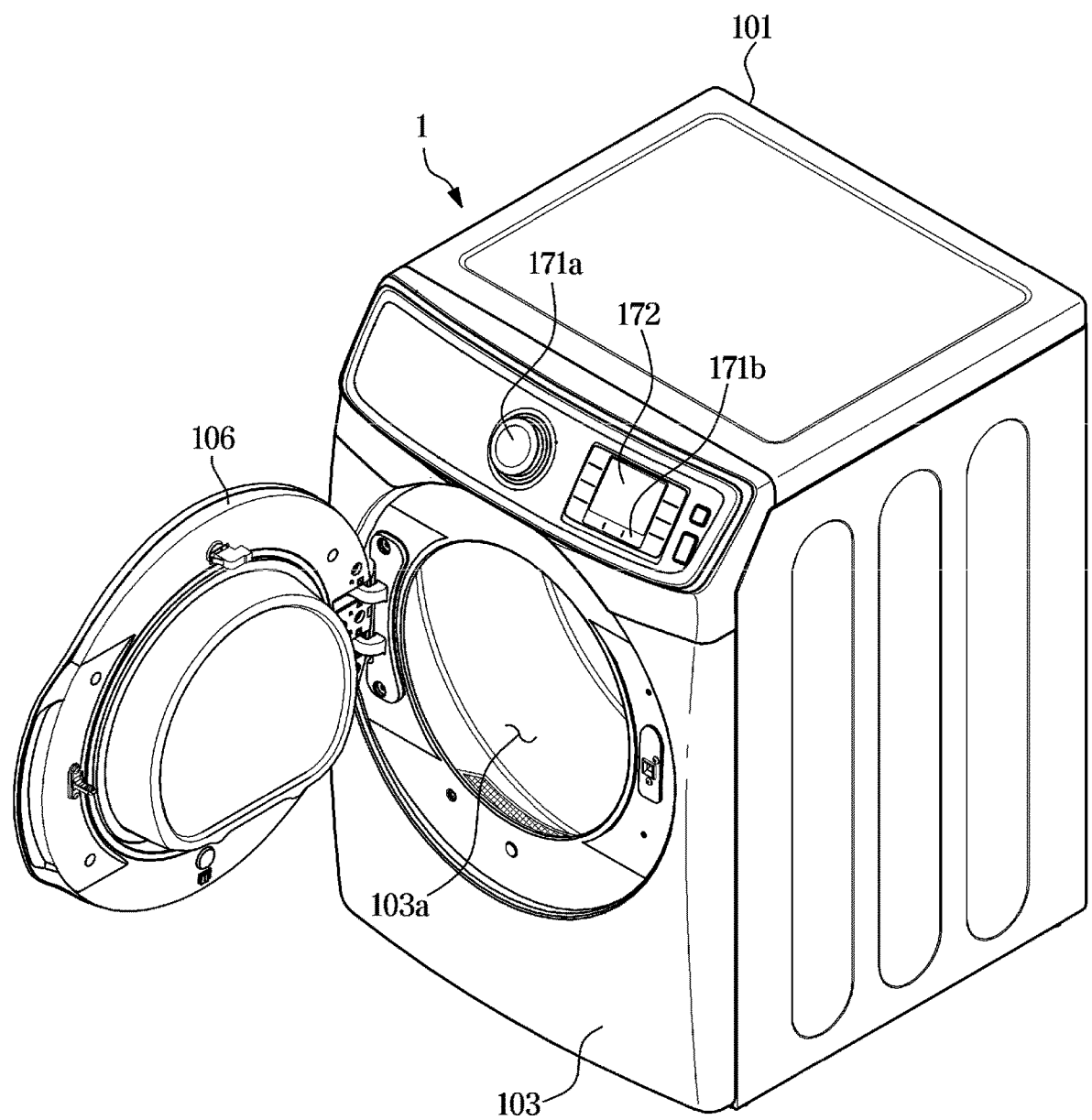
FIG. 1 illustrates an exterior view of a dryer, according to an embodiment of the disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Like numerals refer to like elements throughout the specification. Not all elements of embodiments of the disclosure will be described, and description of what are commonly known in the art or what overlap each other in the embodiments will be omitted. The term 'unit, module, member, or block' may refer to what is implemented in software or hardware, and a plurality of units, modules, members, or blocks may be integrated in one component or the unit, module, member, or block may include a plurality of components, depending on the embodiment of the disclosure.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

Throughout the specification, when it is said that a member is located "on" another member, it implies not only that the member is located adjacent to the other member but also that a third member exists between the two members.

Throughout the specification, when a component is mentioned to send or transmit a signal to another component, it does not exclude a possibility of an intermediate component that exists between the two components, through which to send or transmit the signal, unless otherwise mentioned.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

Embodiments of a wireless sensing device, dryer, and method of controlling the dryer will now be described in detail with reference to accompanying drawings.

Figure 2:
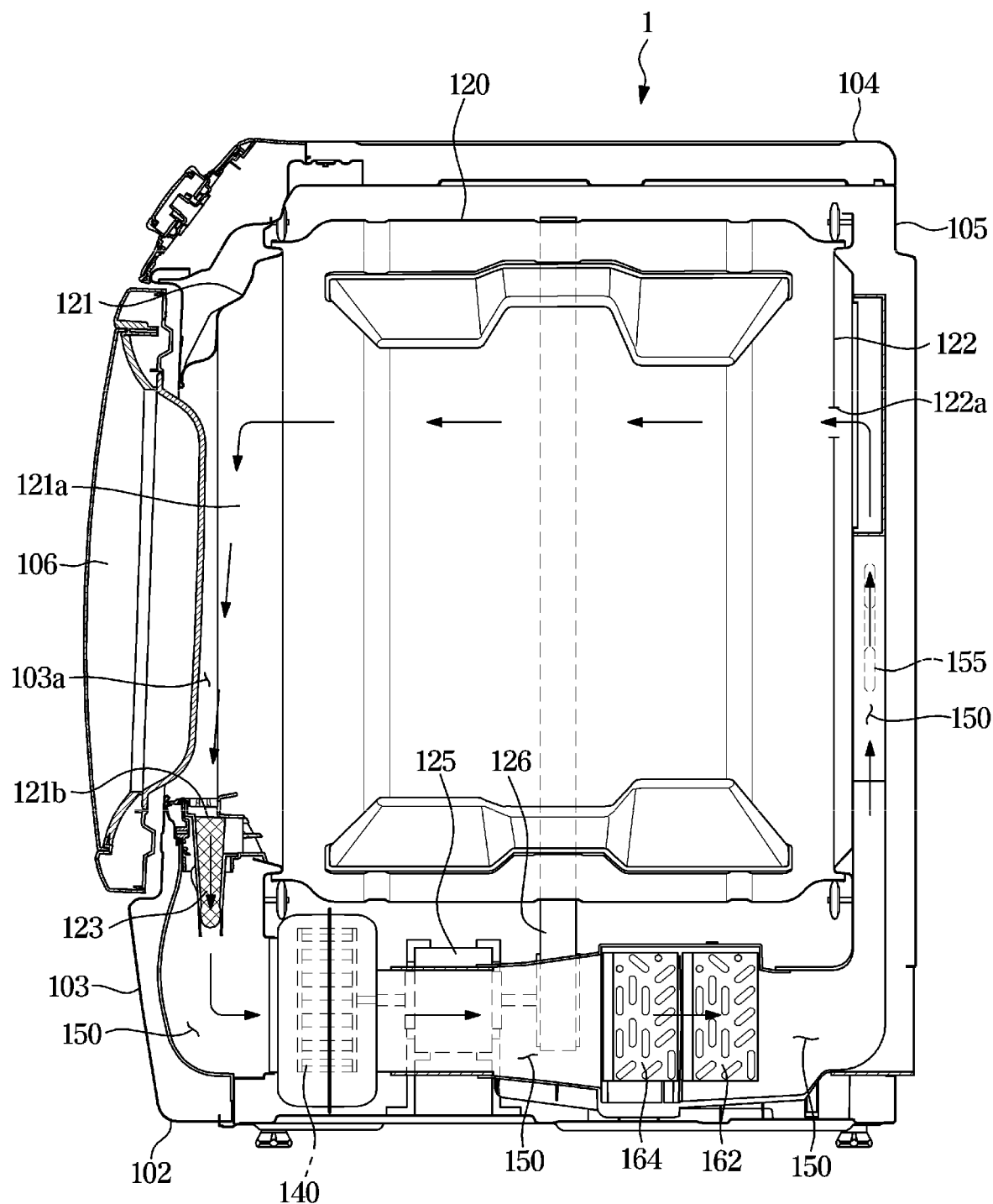
FIG. 2 illustrates a side cross-sectional view of a dryer, according to an embodiment of the disclosure.

FIG. 1 illustrates an exterior view of a dryer, according to an embodiment of the disclosure, and FIG. 2 illustrates a side cross-sectional view of a dryer, according to an embodiment of the disclosure.

Referring to both FIGS. 1 and 2, a dryer 1 according to an embodiment of the disclosure includes a main body 101 defining the exterior of the dryer 1, and a drum 120 rotationally installed in the main body 101 to accommodate laundry.

The main body 101 may include a base plate 102, a front cover 103, a top cover 104, and a side and rear cover 105.

An opening 103a is formed on the front cover 103, and opened or closed by a door 106 pivotally installed on the front cover 103. The drum 120 having the form of a cylinder with an open front may also be opened or closed by the door 106.

On the top of the front cover 103, inputs 171a and 171b for receiving control commands from the user and a display 172 for displaying a screen to present various information about operations of the dryer 1 or guide user inputs.

The inputs 171a and 171b may be provided as a jog shuttle or in the form of a dial, allowing the user to hold and turn the input 171a to enter a control command, or provided as a touch pad or buttons, allowing the user to touch or press the input 171b to enter a control command.

The display 172 may be implemented by various types of display panel, such as liquid crystal display (LCD) panel, a light emitting diode (LED) panel, an organic LED (OLED) panel, a quantum LED (QLED) panel, etc., and also implemented as a touch screen having a touch pad on the front.

A front panel 121 having an entrance 121a formed on the front may be arranged on the front of the drum 120, and the laundry may be thrown into the drum 120 through the entrance 121a. The rear of the drum 120 may be blocked by a rear panel 122 with an inlet 122a through which hot and dry air flows in.

An outlet 121b through which the air used in drying of the laundry flows out may be formed on the front panel 121 of the drum 120, and a filter 123 may be installed at the outlet 121b to capture foreign materials from the laundry.

Furthermore, at least one protruding lifter may be formed on the inner wall of the drum 120 to assist in tumbling of the laundry.

The drum 120 may be rotated by driving force provided from a drum motor 125. The drum 120 may be connected to the drum motor 125 by a belt 126, which may convey the driving force provided from the drum motor 125 to the drum 120.

In order for the dryer 1 to dry the laundry, there may be a heater method of drying the laundry by supplying air heated by a heater into the drum, and a heat pump method of drying the laundry by removing moisture from the laundry. In the embodiment of the disclosure, the latter case that the dryer 1 dries the laundry in the heat pump method will be described as an example.

In this regard, to deal with hot and humid air that has passed the drum 10, there may be an air-vent method of discharging the hot and humid air out of the dryer 1 and a condensing method of removing moisture from the hot and humid air and then having the resultant air circulate back into the drum 120. In the embodiment of the disclosure, the case that the dryer 1 employs the condensing method will be described as an example.

The dryer 1 may include a fan 140 for circulating air in the drum 120. The fan 140 may suck in air from the inside of the drum 120 and release the air to the duct 150. The air from inside the drum 120 may be circulated by the fan 140 between the drum 120 and the duct 150.

A heat pump 160 (see FIG. 8) may be equipped in the duct 150 in which the air from inside the drum 120 circulates. The heat pump 160 may include a compressor, a condenser 162, an evaporator 164, and an expander.

The compressor may compress a gaseous refrigerant into a hot and highly compressed state and discharge the hot and highly compressed gaseous refrigerant. For example, the compressor may compress the refrigerant by reciprocating motions of a piston or rotating motions of a rotor. The discharged refrigerant is passed to the condenser 162.

The condenser 162 may radiate heat while condensing the compressed gaseous refrigerant into a liquid state. The condenser 162 may be arranged in the duct 150 to heat air by the heat radiated in the process of condensing the refrigerant. The heated air may be supplied into the drum 120. The liquid refrigerant condensed by the condenser 162 may be passed to the expander.

The expander may expand the high temperature and high pressure liquid refrigerant condensed by the condenser 162 to a low pressure liquid refrigerant. Specifically, the expander may include an electronic expansion valve whose opening degree is variable by a capillary tube and an electronic signal for controlling the pressure of the liquid refrigerant.

The evaporator 164 may evaporate the liquid refrigerant expanded by the expander. As a result, the evaporator 164 may return the low temperature and low pressure gaseous refrigerant to the compressor.

The evaporator 164 may absorb heat from the surroundings during the evaporation process for turning the low pressure liquid refrigerant to the gaseous refrigerant. The evaporator 164 may be arranged in the duct 150 to cool the air that is passing the evaporator 164 during the evaporation process. When the surrounding air is cooled down by the evaporator 164 and has a temperature fallen below the dew point, the air around the evaporator 164 may be condensed. Water resulting from the air condensation in the evaporator 164 may be collected by a water tray arranged under the evaporator 164. The water collected by the water tray may be moved to a separate reservoir or discharged out of the dryer 1.

Due to the condensation occurring around the evaporator 164, absolute humidity of the air that is passing the evaporator 164 may be reduced. In other words, an amount of water vapor contained in the air passing the evaporator 164 may be reduced. Using the condensation around the evaporator 164, the dryer 1 may reduce the amount of water vapor contained in the air in the drum 120 and dry the laundry.

The evaporator 164 may be located in farther upstream of airflow from the fan 140 than the condenser 162. The air circulating by the fan 140 may be dried out (i.e., water vapor is condensed) by the evaporator 164 while passing the evaporator 164, and then heated by the condenser 162 while later passing the condenser 162.

In the meantime, a heater 155 may be provided to assist the condenser 162 in heating the air. The heater 155 may be located in farther downstream of the airflow from the fan 140 than the condenser 162.

For example, the air in the duct 150 may be sufficiently heated when the heater 155 additionally heats the air that has already been heated by the condenser 162 of the heat pump 160.

The temperature in the drum 120 may rise more rapidly by the heater 155 that assists the condenser 162, so the time taken to dry the laundry may be reduced.

Figure 3:
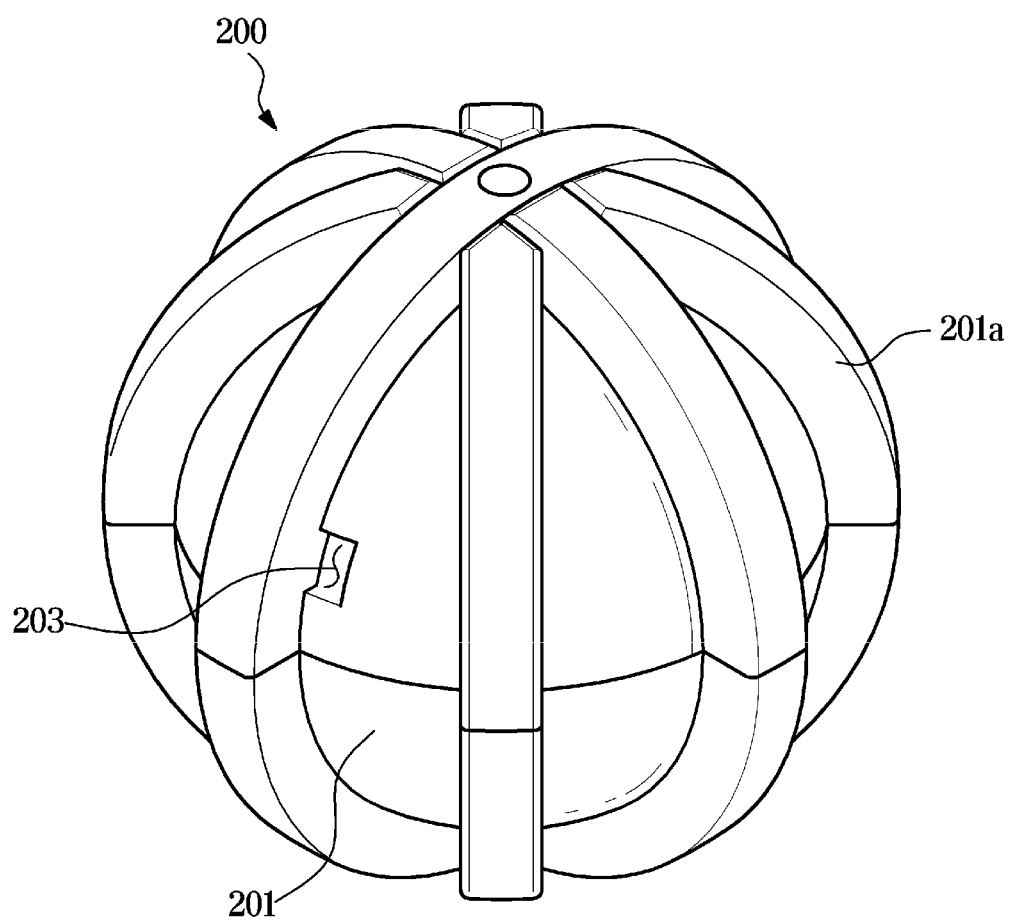
FIG. 3 illustrates an exterior view of a wireless sensing device, according to an embodiment of the disclosure.
Figure 4:
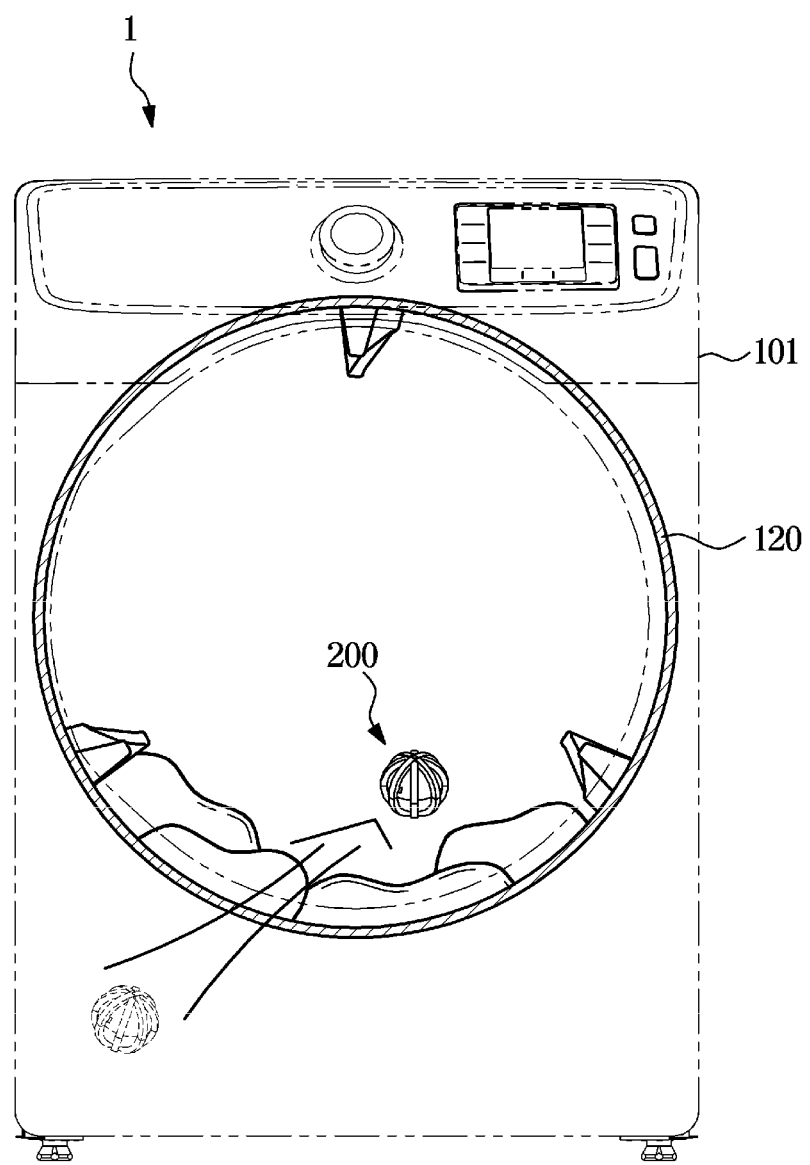
FIG. 4 illustrates a dryer with a wireless sensing device thrown into the dryer, according to an embodiment of the disclosure.

FIG. 3 illustrates an exterior view of a wireless sensing device, according to an embodiment of the disclosure, and FIG. 4 illustrates a dryer with a wireless sensing device thrown into the dryer, according to an embodiment of the disclosure.

Referring to FIG. 3, a wireless sensing device 200 may include a main body 201 defining the exterior of the wireless sensing device 200, and the main body 201 may include a sensing module 210, a sensor controller 220, a sensor communication module 230, and sensor power supplier 240, which will be described later.

At least one opening 203 may be formed on the main body 201. The air in the drum 120 may flow into the main body 201 through the opening 203, and the sensing module 210 arranged in the main body 201 may measure humidity or temperature of the air flowing in.

Alternatively, a portion of the sensing module 210 may be exposed through the opening to measure the humidity or temperature in the drum 120. The aforementioned elements will be described in detail later.

Referring to FIGS. 3 and 4, the wireless sensing device 200 may be physically separated from other elements of the dryer 1, such as the drum 120, the main body 101, etc. Herein, the phrase 'physically separated' means that the wireless sensing device 200 is not connected to the other elements of the dryer 1 via wiring such as a cable, nor fixed to the main body 101 or the drum 120. However, there may be an occasion when the wireless sensing device 200 may be detachably attached to the dryer 1 while the dryer 1 is not activated.

Referring to FIG. 4, the wireless sensing device 200 may be thrown into the drum 120 along with laundry. In other words, the wireless sensing device 200 may be disposed into the drum 120. The term laundry as herein used may be defined by taking into account objects to be dried by an ordinary dryer 1, including wet garments, bed clothes, towels, shoes, etc., resulting from washing, without excluding clothes in a non-washed state.

When the drum 120 is rotated to dry the laundry, the wireless sensing device 200 may make free motions, such as repetition of rotation, free-fall, and tumbling in the drum 120 along with the laundry.

The wireless sensing device 200 may use the motion to create its own energy for operation of the wireless sensing device 200 and to accurately measure humidity in the drum 120. Furthermore, using acceleration data of the wireless sensing device 200, a load of the laundry or whether the laundry is entangled may be determined. This will be described in more detail later.

Although the main body 201 of the wireless sensing device 200 is shown as having the shape of a sphere in the example of FIGS. 3 and 4, it is not limited thereto. The main body 201 may have any size and any shape that may allow itself to freely move in the drum 120, and may be implemented in any of various three-dimensional figures such as a rectangular parallelepiped, a cylinder, etc.

Operation of the wireless sensing device 200 will now be described in more detail with reference to a control block diagram of the wireless sensing device 200.

Figure 5:
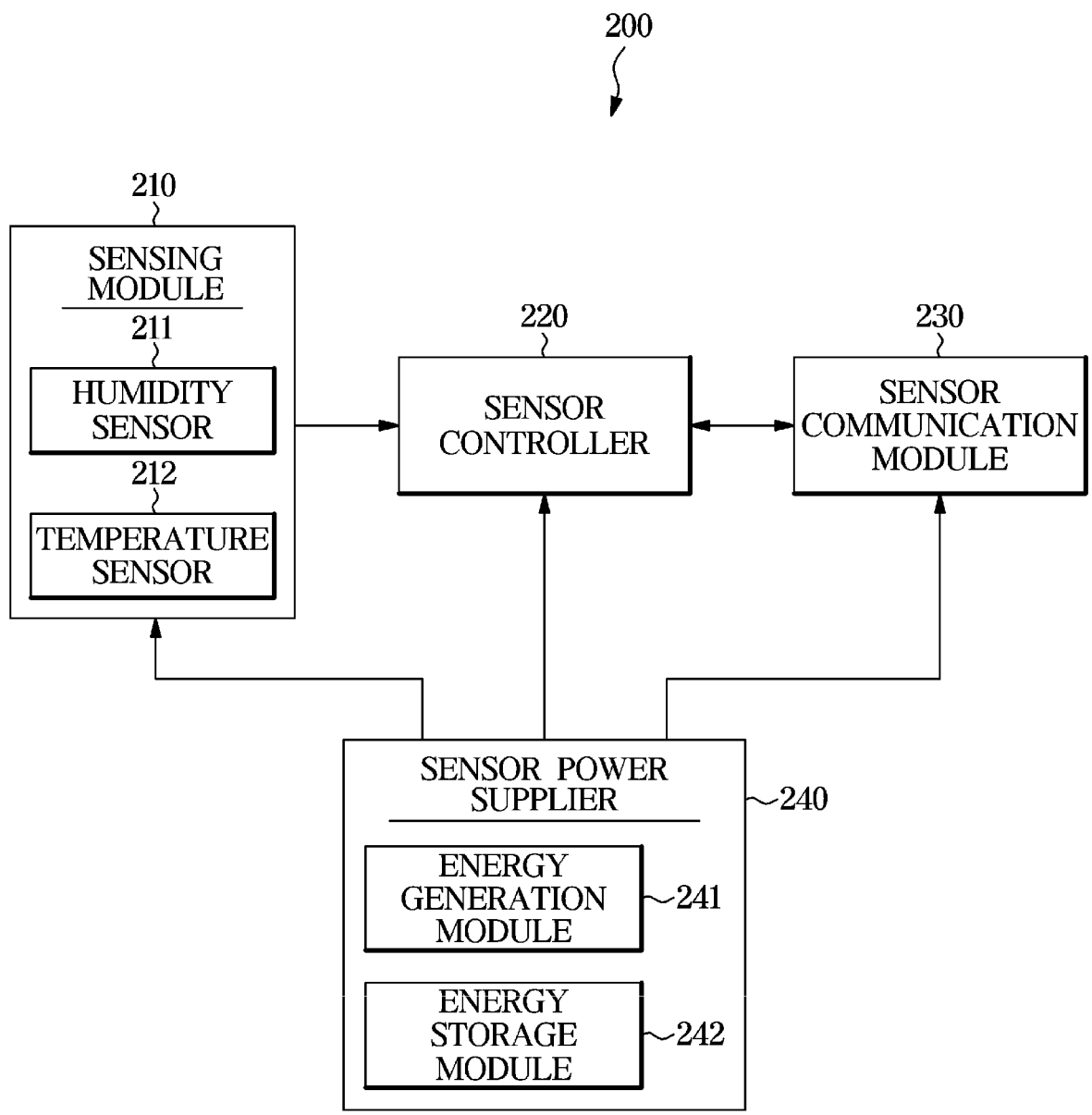
FIG. 5 illustrates a control block diagram of a wireless sensing device.
Figure 6:
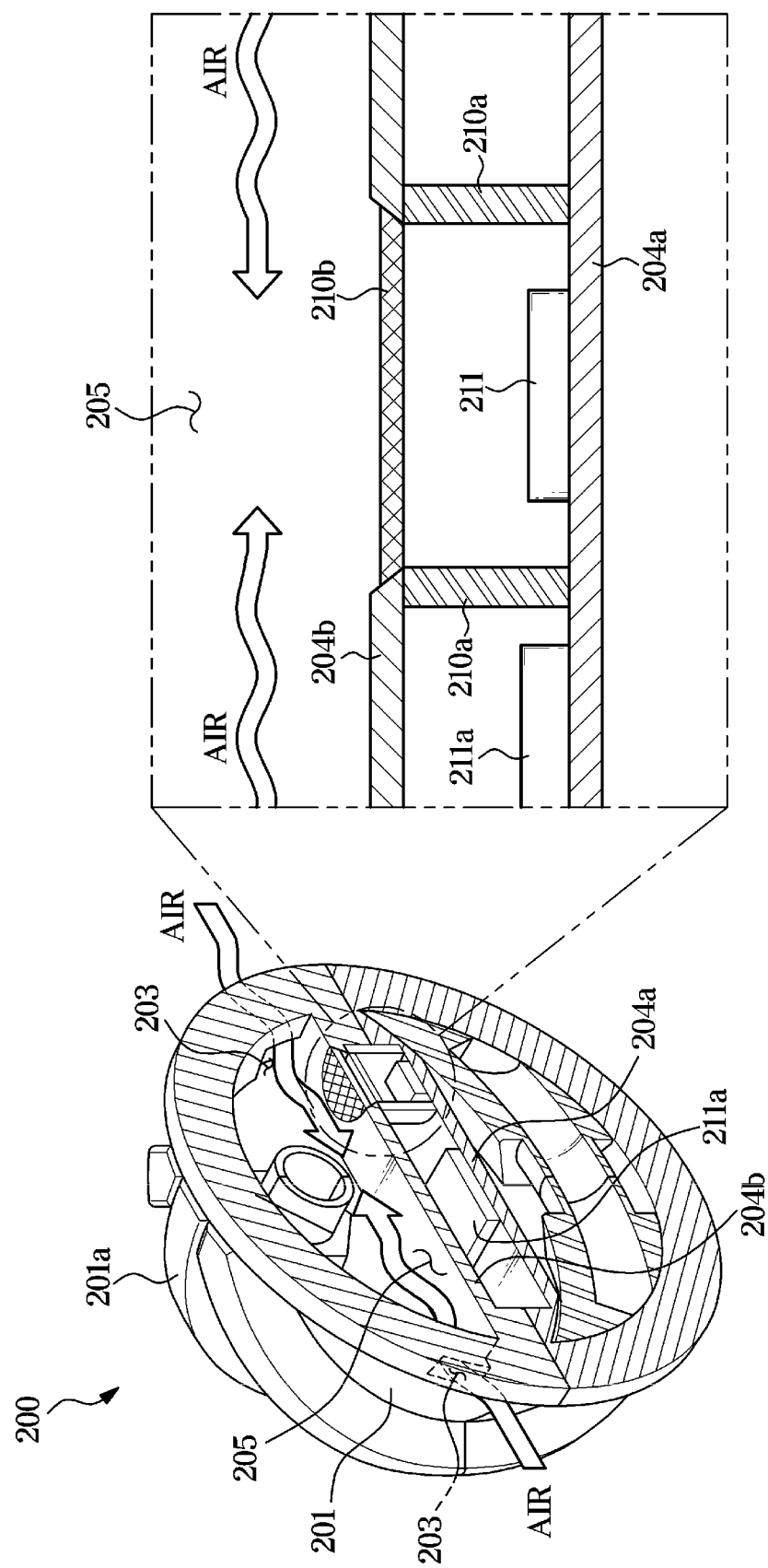
FIG. 6 illustrates a cross-sectional view illustrating a humidity sensor equipped in a wireless sensing device and related structure.

FIG. 5 illustrates a control block diagram of a wireless sensing device, and FIG. 6 illustrates a cross-sectional view illustrating a humidity sensor equipped in a wireless sensing device and related structure.

Referring to FIG. 5, in an embodiment of the disclosure, the wireless sensing device 200 may include the sensing module 210 that includes a humidity sensor 211 for measuring humidity in the drum 120, a sensor communication module 230 for transmitting or receiving data through wireless communication with a main communication module 130 of the dryer 1 (see FIG. 8), a sensor controller 220 for controlling the sensor communication module 230 to transmit a humidity value corresponding to an output of the sensing module 210 to the main communication module 130, and a sensor power supplier 240 for supplying power to the sensing module 210, the sensor communication module 230, and the sensor controller 220.

The humidity sensor 211 may employ one of various methods of measuring humidity to measure the humidity in the drum 120. For example, the humidity sensor 211 may measure the humidity in an electrically resistive method or an electrically capacitive method.

The conventional dryer has a structure in which a humidity sensor connected to an external power source is mounted in the dryer but has a limited mounting location by the nature of continuous rotation of the drum. Hence, it is common for most of the conventional humidity sensors to be fixed on the front surface or the rear surface of the drum. In this case, sometimes, the humidity sensor may not come into contact with the laundry depending on weight or textile properties of the laundry, which causes reduction in measurement accuracy of the humidity value.

In an embodiment of the disclosure, the wireless sensing device 200 may measure the humidity in a way of directly contacting the laundry or in a way of measuring moisture contained in the air in the drum 120. In either way, the wireless sensing device 200 may output a value representing humidity in the drum 120.

In an embodiment of the disclosure, the wireless sensing device 200 moves freely along with the laundry in the drum 120, easily contacting the laundry and thus obtaining more accurate humidity data from the output of the humidity sensor 211. Furthermore, the wireless sensing device 200 freely moves everywhere in the drum 120, so that it may provide higher accuracy in measuring moisture contained in the air in the drum 120.

The sensing module 210 may further include a temperature sensor 212. When the humidity sensor 211 included in the sensing module 210 measures relative humidity, the sensor controller 220 may calculate an absolute humidity value in the drum 120 using an output of the humidity sensor 211 and an output of the temperature sensor 212. Alternatively, the sensor controller 220 may just transmit an output of the humidity sensor 211 and an output of the temperature sensor 212 to the main communication module 130 through the sensor communication module 230, and then the main controller 110 of the dryer 1 may perform calculation of the absolute humidity value.

FIG. 6 shows a structure applicable when the humidity sensor employs a method of measuring moisture in the air. An enlarged view on the right in FIG. 6 is a front view of the cross-section shown on the left.

Referring to FIG. 6, the air in the drum 120 may flow into the main body 201 through the opening 203 formed on the main body 201. As described above, the wireless sensing device 200 makes motions, such as rotation, free-fall, tumbling, etc., when the drum 120 is rotated, so that, even without a separate blower device such as a fan, air may be brought into the wireless sensing device 200.

The space in the main body 201 may be divided by a first plate 204a and a second plate 204b. For example, the humidity sensor 211 and a printed circuit board (PCB) 211a connected to the humidity sensor 211 may be arranged in the space between the first and second plates 204a and 204b. A structure of connection, e.g., wiring, between the PCB circuit 211a and the humidity sensor 211 is not shown in FIG. 6. It is, however, shown for just convenience, and the PCB circuit 211a and the humidity sensor 211 may share a substrate and all electronic parts but the humidity sensor 211 may be arranged in an area represented for the PCB circuit 211a. In other words, in the embodiment of the disclosure, the PCB circuit 211a may refer to a circuit structure including all the electronic parts but the humidity sensor 211.

A hole may be formed in an area of the second plate 204b corresponding to the location of the humidity sensor 211. The area of the second plate 204b corresponding to the location of the humidity sensor 211 may refer to an area above the humidity sensor 211 or an area facing the humidity sensor 211.

The space between the second plate 204b and the inner wall of the main body 201 may serve as a flow path 205 in which air flows. The air brought in through the opening 203 may flow in the flow path 205, and contact the humidity sensor 211 through the hole formed at the second plate 204b.

The humidity sensor 211 may measure humidity in the air brought in through the hole formed at the second plate 204b.

In the meantime, it is possible to arrange a moisture passing filter 210b across the hole formed at the second plate 204b to protect the humidity sensor 211. The moisture passing filter 210b may pass moisture but filter out foreign materials such as water drops or dust, thereby protecting the humidity sensor 211 and the PCB circuit 211a connected to the humidity sensor 211 against the foreign materials.

It is also possible to enclose the humidity sensor 211 with a heat shielding wall 210a. In this case, the PCB circuit 211a may be placed outside the heat shielding wall 210a to prevent the PCB circuit 211a from being damaged or malfunctioning by heat from the moisture having passed through the moisture passing filter 210b. In another example, it is also possible to enclose the PCB circuit 211a with the heat shielding wall.

According to the aforementioned example in FIG. 6, the opening 203 formed on the wireless sensing device 200 and motions of the wireless sensing device 200 may enable the air in the drum 120 to flow into the wireless sensing device 200 without a separate blower device; the moisture passing filter 210b may protect the humidity sensor 211 and the PCB circuit 211a against foreign materials; and the heat shielding wall 210a enclosing the humidity sensor 211 may protect the PCB circuit 211a against heat.

In the meantime, when the humidity sensor 211 measures humidity by directly contacting the laundry, an electrode of the humidity sensor 211 may be exposed through the opening 203; a conductive material may be applied onto a projection 201*a* formed on the outer wall of the main body 201 and may serve as an electrode of the humidity sensor 211; or the projection 201*a* formed on the outer wall of the main body 201 may be made with a conductive substance to serve as the electrode of the humidity sensor 211.

What are described above is merely an example to be applied to the wireless sensing device 200. Embodiments of the wireless sensing device 200 are not limited thereto.

The sensor controller 220 may include at least one memory for storing a program for carrying out the aforementioned and following operations, and at least one processor for executing the program. For example, the sensor controller 220 may be implemented with a micro controller unit (MCU).

The sensor communication module 230 may include at least one of wireless communication modules, such as a Bluetooth module, a Bluetooth low energy (BLE) module, a wireless fidelity (Wi-Fi) module, etc. There are no limitations on the type of the communication module to be applied to the sensor communication module 230 as long as the communication module may be able to transmit or receive data through wireless communication with the main communication module 130 of the dryer 1.

The sensor power supplier 240 may supply its own power to the elements of the wireless sensing device 200 without being connected to an external power source. For this, the sensor power supplier 240 may employ an energy harvesting technology to create its own electric energy, or even receive power from a battery. An occasion when the energy harvesting technology is applied will now be described.

The energy harvesting technology is used to collect abandoned energy to generate electric energy. An energy generation module 241 may create electric energy used to operate the wireless sensing device 200 using the energy harvesting technology that employs at least one of an electromagnetic induction method, a triboelectrification method, piezoelectric method, or thermoelectric method.

Specifically, the energy generation module 241 may generate electric energy by inducing electromagnetic fields, generating electricity by friction, or making a piezoelectric effect using kinetic energy generated by the wireless sensing device 200 while the wireless sensing device 200 makes at least one of rotation, free-fall, or tumbling motions.

Alternatively, the energy generation module 241 may convert thermal energy from hot air in the drum 120 to electric energy.

Figure 7:
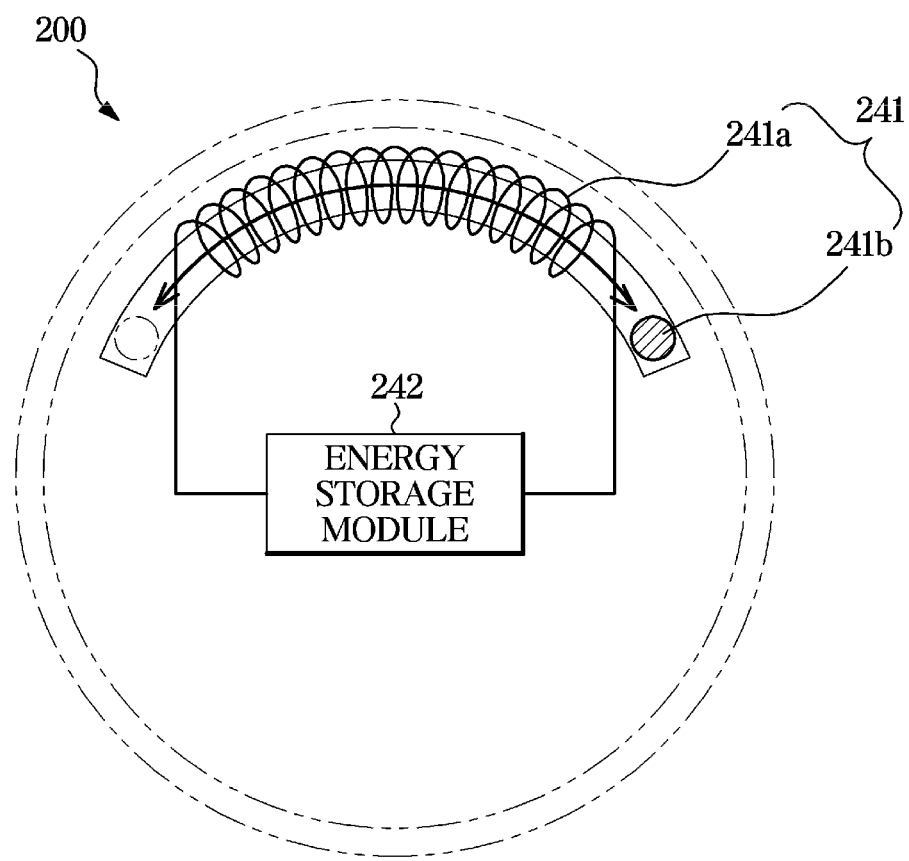
FIG. 7 illustrates a diagram for describing an operation of a wireless sensing device generating energy in an electromagnetic induction method, according to an embodiment of the disclosure.

FIG. 7 illustrates a diagram for describing operation of a wireless sensing device generating energy in an electromagnetic induction method, according to an embodiment of the disclosure.

In the case that the energy generation module 241 uses the electromagnetic induction method to generate electric energy, the energy generation module 241 may include a coil 241*a* and a magnet 241*b*. The magnet 241*b* has a position and shape to be able to move around the coil 241*a* when the drum 120 is rotated. For example, the magnet 241*b* may be shaped like a sphere and positioned to be able to move around inside the coil 241*a*.

The wireless sensing device 200 thrown into the drum 120 may make rotation, free-fall, or tumbling motions due to rotation of the drum 120, and the magnet 241*b* equipped in the wireless sensing device 200 may move around inside the coil 241*a* with the motion of the wireless sensing device 200. When the magnet 241*b* moves around inside the coil 241*a*, an induced current flows in the coil 241*a* according to the electromagnetic induction law, causing induced electromotive force at both ends of the coil 241*a*.

Alternatively, the coil 241*a* may move while the magnet 241*b* is stationary. Mutual movements of the magnet 241*b* and the coil 241*a* are the same as in the embodiment of FIG. 7, and similarly, an induced current flows in the coil 241*a* according to the electromagnetic induction, causing induced electromotive force at both ends of the coil 241*a*.

The induced electromotive force is stored in an energy storage module 242. The energy storage module 242 may include at least one element such as a capacitor that may store energy.

Electric energy stored in the energy storage module 242 may be supplied to the sensing module 210, the sensor controller 220, and the sensor communication module 230.

As described above, the wireless sensing device 200 may create its own power even without receiving power from the dryer 1 by generating electric energy by applying the energy harvesting technology to the kinetic energy generated when the wireless sensing device 200 is freely moving around in the drum 120. Accordingly, the wireless sensing device 200 may be able to measure humidity and transmit the result to the main communication module 130 of the dryer 1 with the power created by itself even without being connected to the dryer 1 via cable or attached to the dryer 1.

Figure 8:
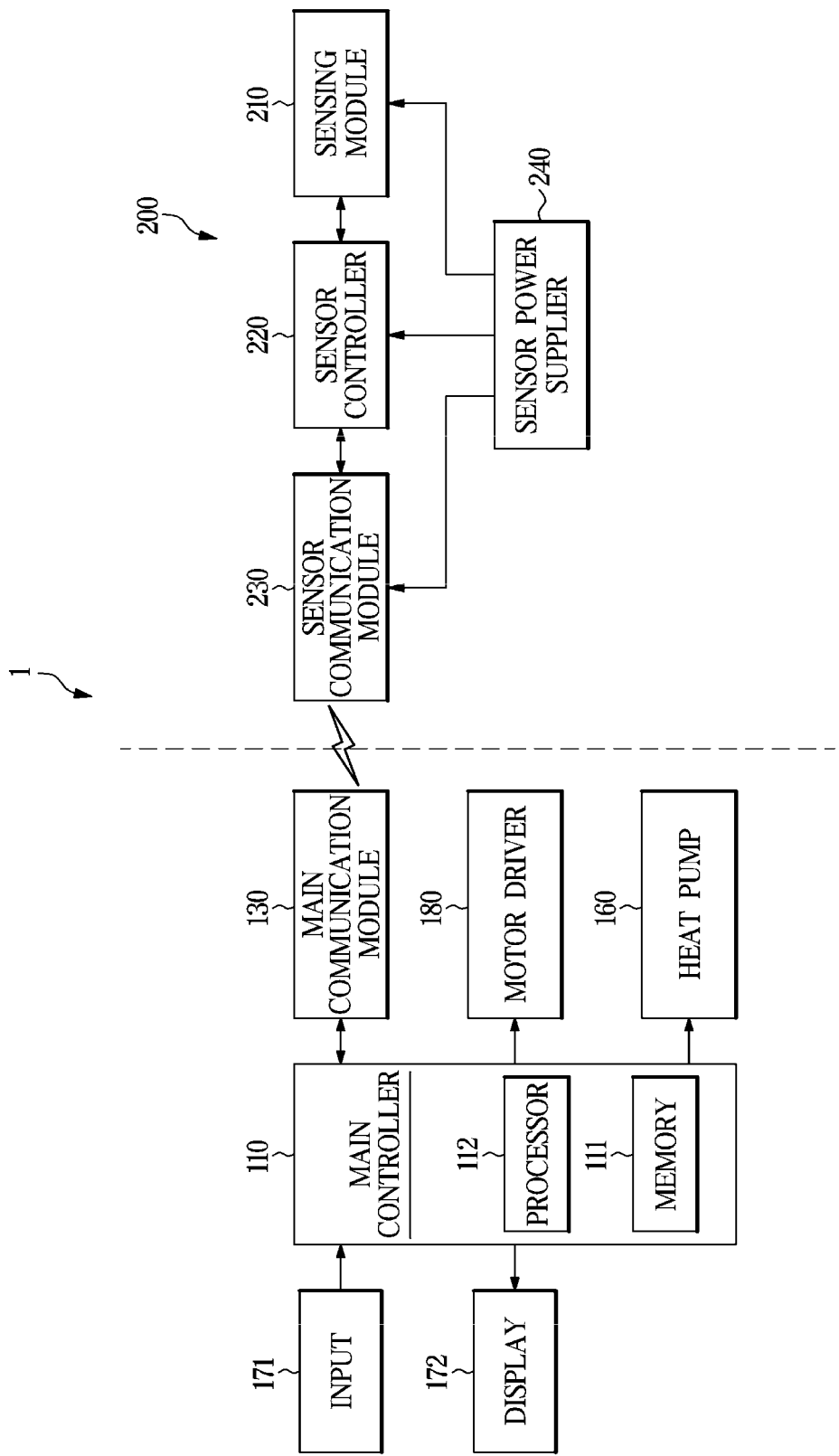
FIG. 8 illustrates a control block diagram of a dryer, according to an embodiment of the disclosure.

FIG. 8 illustrates a control block diagram of a dryer, according to an embodiment of the disclosure.

Referring to FIG. 8, in addition to the elements as described above in connection with FIGS. 1 and 2, the dryer 1 may include the main communication module 130 for receiving a humidity value from the wireless sensing device 200 and the main controller 110 for determining that drying is completed when the received humidity value reaches a set threshold.

The main communication module 130 may exchange data with the sensor communication module 230 of the wireless sensing device 200 through wireless communication. Accordingly, it may include a communication module that corresponds to the communication method of the wireless sensing device 200. For example, the main communication module 130 may include at least one of wireless communication modules, such as a Bluetooth module, a BLE module, a Wi-Fi module, etc.

furthermore, the main communication module 130 may further include a communication module for communicating with an external server or another home appliance.

The main controller 110 may include at least one memory 111 for storing a program for carrying out the aforementioned and following operations, and at least one processor 112 for executing the program. For example, the main controller 110 may be implemented with an MCU.

The main controller 110 may control general operation of the dryer 1 as well as determine a drying completion time based on the humidity value. A drying course may include operation of the heat pump 160 and rotation of the drum 120. In addition, the drying course may also include operation of the heater 155. As the heat pump 160 operates, the inside of the drum 120 may be dehumidified and hot air may be supplied into the drum 120. As the drum 120 is rotated, the laundry may be tumbled, making it more effective to heat and remove moisture from the laundry.

Accordingly, the main controller 110 may control the heat pump 160 and the drum 120 to perform the drying course. For example, the main controller 110 may control rotations of the drum 120 and the fan 140 by sending control signals to a motor driver 180 to drive a drum motor 125 to rotate the drum 120 and a fan motor to rotate the fan 140. The motor driver 180 may include a motor driving circuit.

Furthermore, the main controller 110 may remove humidity in the drum 120 and supply hot air into the drum 120 by sending a control signal to the heat pump 160. As described above, when the heater 155 is located in the duct 150, the main controller 110 may send a control signal even to the heater 155 to raise the temperature of the hot air supplied to the drum 120.

The user may enter commands to power on/off, select the drying course, start/stop the drying course, etc., by manipulating the input 171. As described above, the input 171 may include the inputs 171a and 171b as shown in FIG. 1, and may further include a microphone to receive a voice command when the main controller 110 may be able to perform voice recognition.

The main controller 110 may send a control signal to each element of the dryer 1 in response to a command entered to the input 171 by the user.

As described above, the display 172 may display a screen to indicate various information about operation of the dryer 1 or to guide an input from the user. Furthermore, the display 172 may display an expected time taken to complete drying, which will be described later.

Furthermore, the dryer 1 may include the wireless sensing device 200 having the aforementioned structure. In an embodiment of the disclosure, the wireless sensing device 200 may be manufactured and sold separately from the dryer 1.

Figure 9:
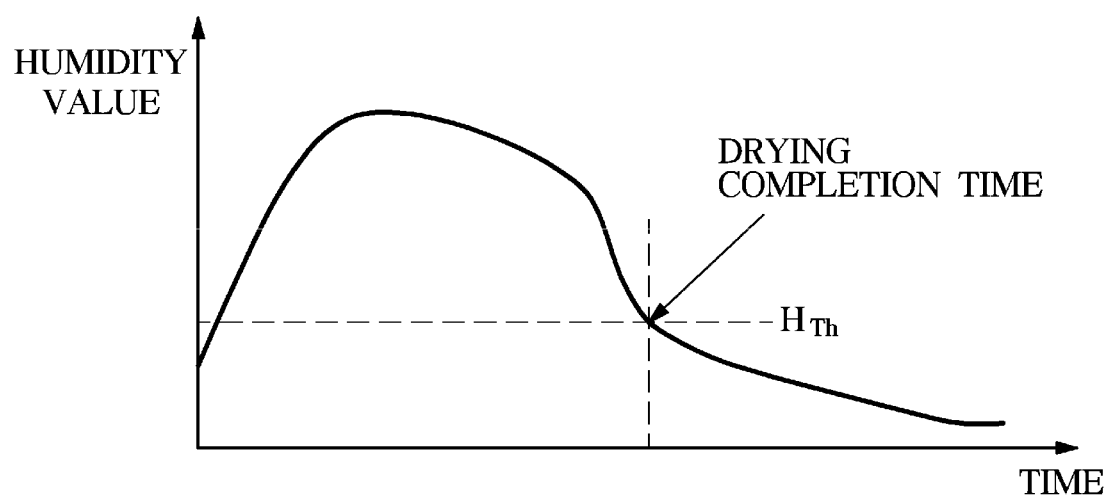
FIG. 9 illustrates a graph representing an example of humidity values used by a dryer to determine drying completion time, according to an embodiment of the disclosure.

FIG. 9 illustrates a graph representing an example of humidity values used by a dryer to determine drying completion time, according to an embodiment of the disclosure.

When wet laundry is thrown into the drum 120, humidity rises in the drum 120, and as the drying course proceeds, hot air is supplied into the drum 120, heating the air and the laundry in the drum 120 and thus evaporating the moisture of the laundry. The highly humid air is moved to the condenser 162 through the duct 150 and dehumidified, and once the moisture completely comes out of the laundry, humidity in the drum 120 reaches a certain level.

Humidity values reflecting such an effect are like what is shown in FIG. 9. Humidity in the drum 120 rises due to the moisture of the laundry, and decreases again as the moisture in the air is removed by the heat pump 160 and the laundry is dried. Once the laundry is completely dried, the humidity reaches to a certain level. The main controller 110 may store a humidity value at the certain level, $H_{TH}$ as a threshold in advance, and determine that drying of the laundry is completed when the humidity value transmitted from the wireless sensing device 200 reaches the threshold. For example, the threshold stored in advance may be set by experiment, statistic, simulation, etc.

To prevent determination that drying is completed while the humidity value rises, the main controller 110 may determine whether drying is completed after a set period of time after the start of the drying course or after the humidity value reaches the peak and then starts to decrease.

The threshold used in determination of completion of drying may be differently set depending on the load of the laundry. For this, the dryer 1 may determine a load of the laundry thrown into the drum 120. This will now be described in connection with FIGS. 10 to 13.

Figure 10:
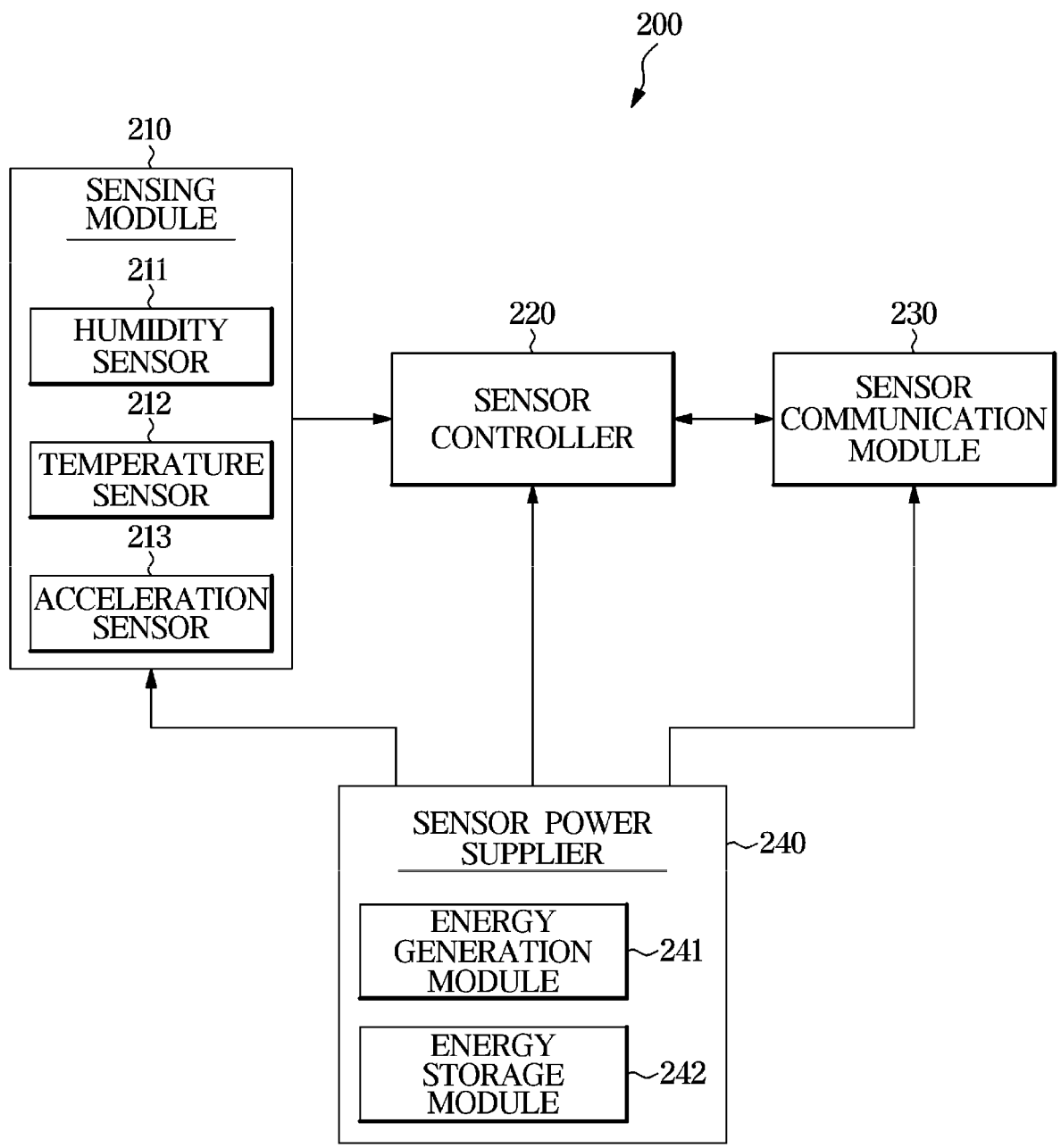
FIG. 10 illustrates a control block diagram of a wireless sensing device equipped with an acceleration sensor.
Figure 11:
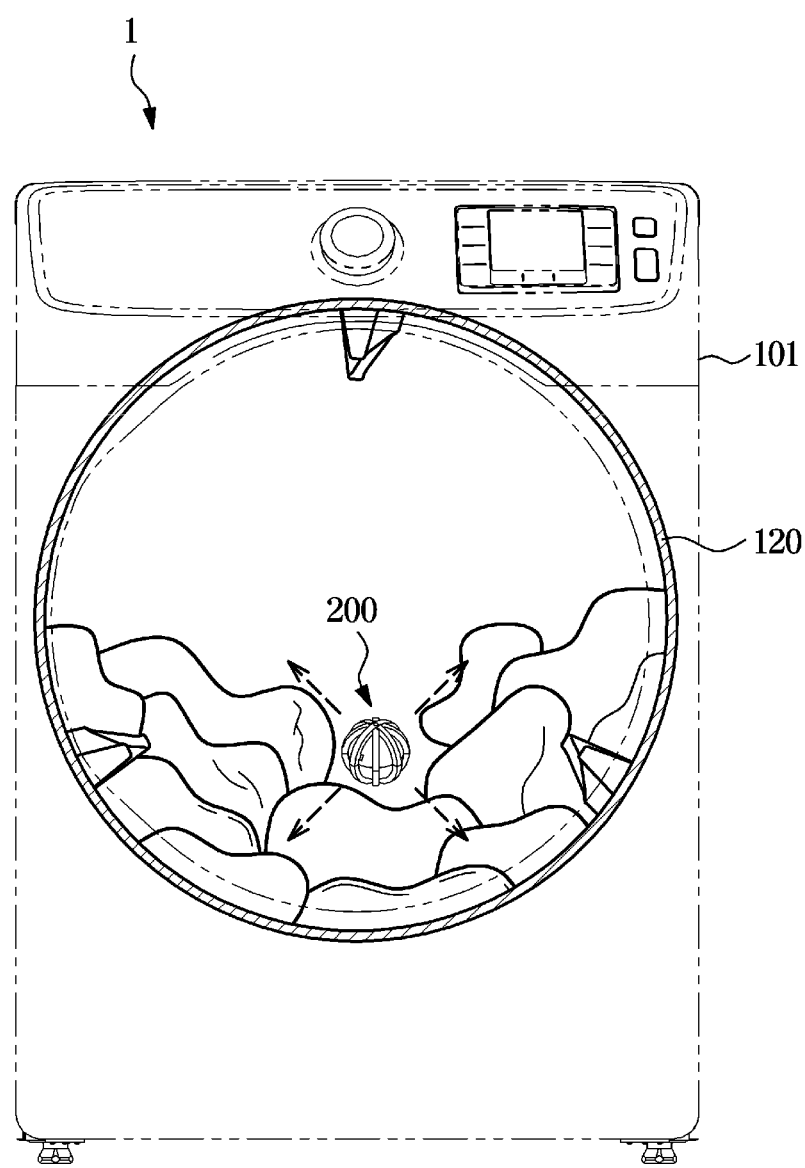
FIGS. 11 and 12 illustrate motions of a wireless sensing device depending on a load of laundry.
Figure 12:
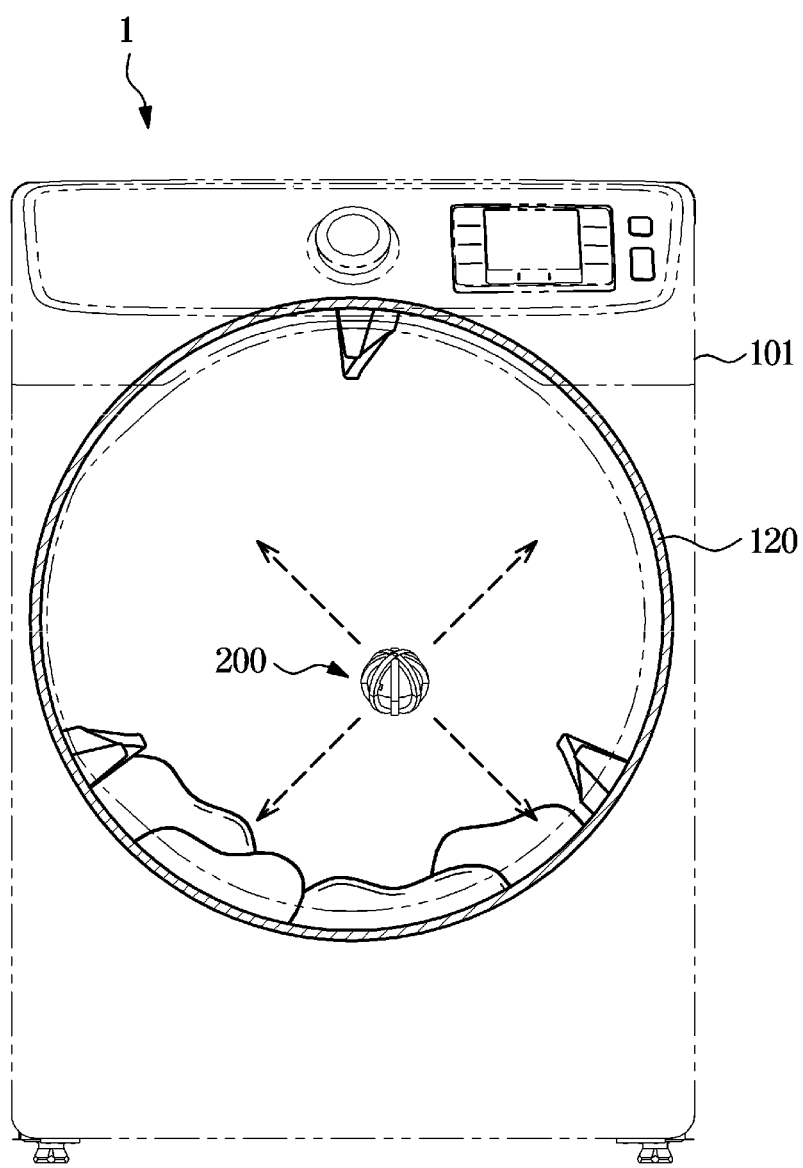
Figure 13:
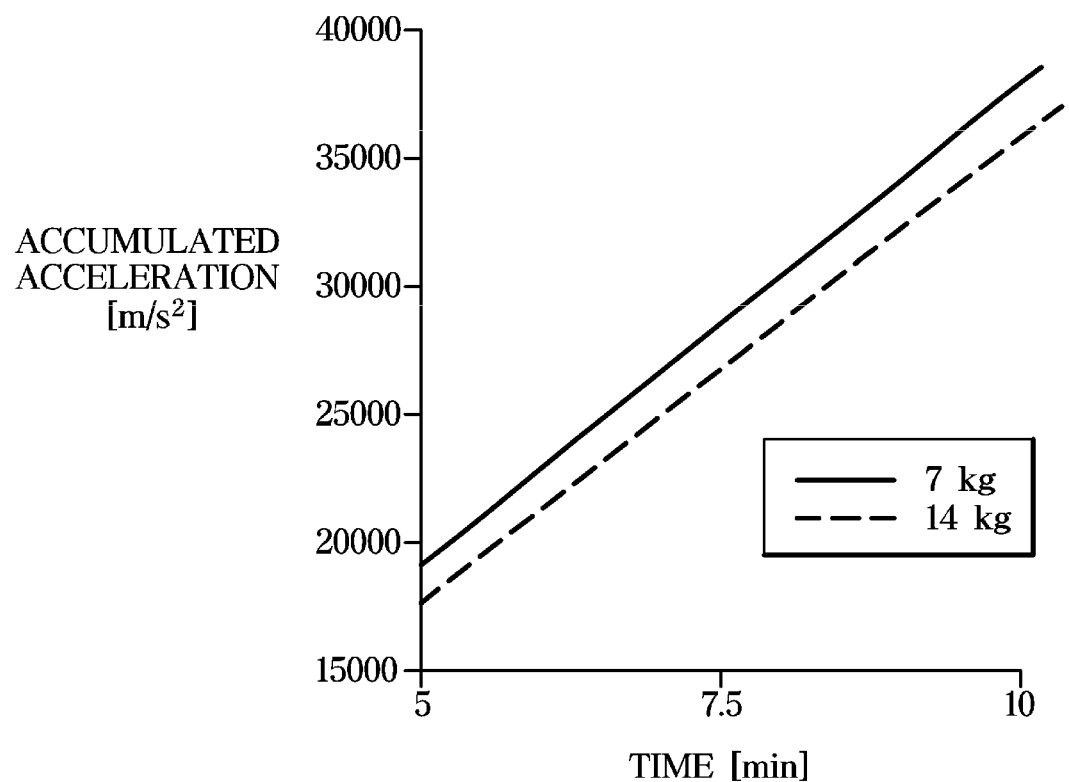
FIG. 13 illustrates a graph representing a relationship between acceleration of a wireless sensing device and load of laundry.

FIG. 10 illustrates a control block diagram of a wireless sensing device equipped with an acceleration sensor, FIGS. 11 and 12 illustrate motions of a wireless sensing device depending on the load of laundry, and FIG. 13 illustrates a graph representing a relationship between acceleration of a wireless sensing device and load of laundry.

Referring to FIG. 10, in an embodiment of the disclosure, the sensing module 210 of the wireless sensing device 200 may further include an acceleration sensor 213 for measuring acceleration. The sensor controller 220 may control the sensor communication module 230 to transmit an acceleration value corresponding to an output of the acceleration sensor 213 to the main communication module 130.

As described above, the wireless sensing device 200 thrown into the drum 120 along with the laundry is moved along with the laundry due to rotation of the drum 120. In this case, as shown in FIG. 11, the more the load of the laundry, the smaller the space in which the wireless sensing device 200 may be able to move around, and as a result, the wireless sensing device 200 makes small motions. In the embodiment of the disclosure, the load of laundry may refer to weight or volume of the laundry.

On the other hand, as shown in FIG. 12, the less the load of the laundry, the larger the space in which the wireless sensing device 200 may be able to move around, and as a result, the wireless sensing device 200 makes big motions.

FIG. 13 shows a graph representing accumulated values of acceleration measured by the acceleration sensor 213 when there are 7 kg and 14 kg of laundry, respectively. The accumulated value is an absolute value of acceleration.

Referring to FIG. 13, it may be seen that the accumulated absolute value of acceleration in the case of 14 kg of laundry may be less than that of 7 kg of laundry.

Accordingly, the main controller 110 may determine a load of laundry based on an acceleration value transmitted from the wireless sensing device 200. The main controller 110 may accumulate absolute values of acceleration for a predefined time, or the sensor controller 220 of the wireless sensing device 200 may transmit an accumulated absolute value.

Specifically, the main controller 110 may store at least one threshold used to determine a load of the laundry, and compare the accumulated acceleration value from the wireless sensing device 200 with the threshold to determine a load of the laundry.

For example, the main controller 110 may determine a load of the laundry to be 'large' when the accumulated acceleration value from the wireless sensing device 200 is equal to or less than a first threshold, 'medium' when the accumulated acceleration value from the wireless sensing device 200 exceeds the first threshold but is equal to or less than a second threshold, and 'small' when the accumulated acceleration value from the wireless sensing device 200 exceeds the second threshold.

Furthermore, through experiment, statistics, or simulation, 'large', 'medium', and 'small' that represent the load of the laundry may each be defined with upper and lower limits of weight.

Moreover, through experiment, statistics, or simulation, the accumulated acceleration value and corresponding weight of the laundry may be matched and stored, or rules or equations to derive weight of the laundry corresponding to the accumulated acceleration value may be obtained and stored.

In determining a load of the laundry, without using the separate acceleration sensor 213, an amount of energy generated by the sensor power supplier 240 may be used. As described above, the energy generation module 241 may generate electric energy using kinetic energy of the wireless sensing device 200. According, it may be seen that the higher the electric energy generated, the higher the kinetic energy of the wireless sensing device 200, which may mean that a load of the laundry is small.

The sensor controller 220 may control the sensor communication module 230 to notify the main communication module 130 of an amount of energy generated by the energy generation module 241. The main controller 110 may then determine a load of the laundry based on the amount of energy. The amount of energy transmitted may be an accumulated value of the induced electromotive force generated from the energy generation module 241 for a certain time, or a power value stored in the energy storage module 242.

In the same way of using the acceleration value, the main controller 110 may store at least one threshold to be used in determining a load of the laundry, and compare the amount of energy transmitted with the threshold to determine a load of the laundry.

For example, the main controller 110 may determine a load of the laundry to be 'large' when the amount of energy transmitted is equal to or less than a first threshold, 'medium' when the amount of energy transmitted exceeds the first threshold but is equal to or less than a second threshold, and 'small' when the amount of energy transmitted exceeds the second threshold.

Furthermore, through experiment, statistics, or simulation, 'large', 'medium', and 'small' that represent the load of the laundry may each be defined with upper and lower limits of weight.

Moreover, through experiment, statistics, or simulation, the amount of energy transmitted and corresponding weight of the laundry may be matched and stored, or rules or equations to derive weight of the laundry corresponding to the amount of energy transmitted may be obtained and stored.

In the meantime, the larger the load of the laundry, the more the moisture contained in the laundry, so a reference humidity value used in determining completion of drying may be set to be high. For example, the main controller 110 may set the reference humidity value to 'A' when the load of the laundry determined based on the acceleration value of the wireless sensing device 200 is 'large', 'B' when the load of the laundry is 'medium', and 'C' when the load of the laundry is 'small', where A>B>C.

Based on the load of the laundry, the main controller 110 may set a threshold to be used in determining completion of drying as described above and further determine expected time to complete drying, as will be described below. Accordingly, determination of a load of the laundry can be made in the beginning of the drying course, so that within a set time after the drum 120 starts to rotate, the load of the laundry may be determined, the threshold to be used in determining completion of drying may be set, and the expected time to complete drying may be determined. For example, the aforementioned operations may be performed within two or five minutes.

The threshold to be used in determining completion of drying being differently set depending on the load of the laundry is merely an example used in embodiments of the dryer 1. In another example, a single threshold to be used in determining completion of drying may be set regardless of the load of the laundry and drying may be determined as completed when measured humidity reaches the threshold.

Figure 14:
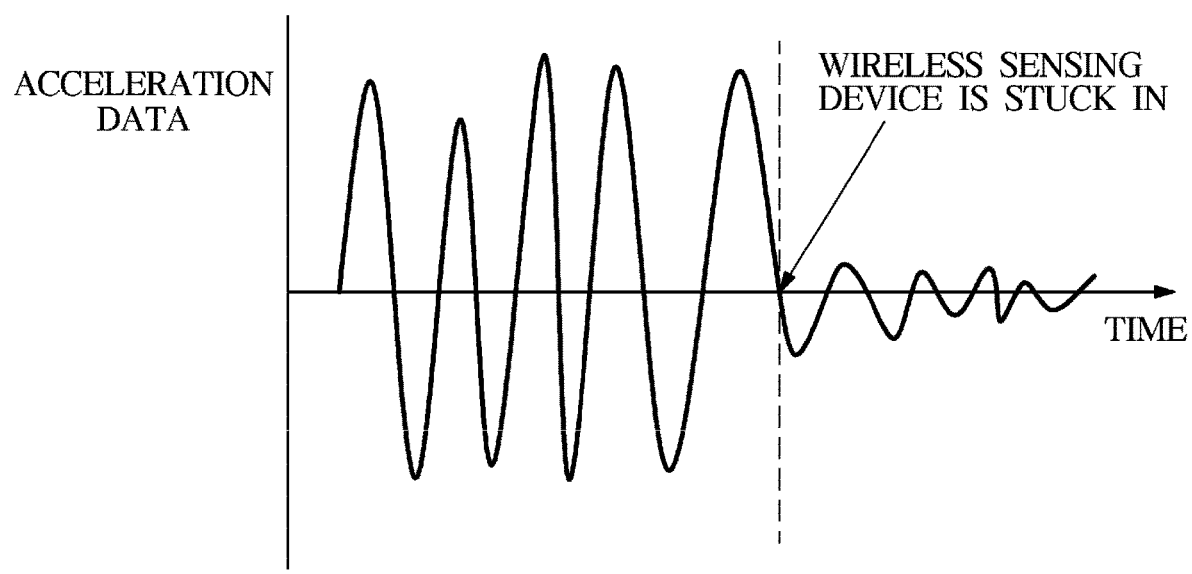
FIG. 14 illustrates a graph representing changes in acceleration of a wireless sensing device.

FIG. 14 illustrates a graph representing changes in acceleration of a wireless sensing device.

As described above, the wireless sensing device 200 is thrown into the drum 120, and moved along with the laundry as the drum 120 is rotated. Hence, the wireless sensing device 200 may sometimes be stuck in the entangled laundry.

The wireless sensing device 200 freely moving around in the drum 120 due to rotation of the drum 120 has big changes in acceleration before stuck in the laundry, as shown in FIG. 14. When the wireless sensing device 200 is stuck in the laundry, an amount of acceleration change is drastically reduced.

The main controller 110 may monitor the acceleration of the wireless sensing device 200 and when the amount of acceleration change is reduced by a set threshold or more, i.e., when a reduction in the amount of acceleration change is equal to or greater than the threshold, determine that the laundry is entangled. Specifically, the main controller 110 may calculate the amount of acceleration change for a set time, and when the amount of acceleration change is reduced by the threshold or more, determine that the laundry is entangled. For example, when the acceleration change has periodicity and an amount of reduction in amplitude is equal to or greater than a threshold, it may be determined that the laundry is entangled.

Furthermore, without using the acceleration value, whether the laundry is entangled may be determined based on an amount of energy generated by the energy generation module 241 of the wireless sensing device 200. As described above, the larger the motion of the wireless sensing device 200, the greater the amount of energy generated by the energy generation module 241, so it may be seen that the less the motion of the wireless sensing device 200, the smaller the amount of the energy generated by the energy generation module 241.

Accordingly, when the sensor controller 220 or the main controller 110 monitors the amount of energy generated by the energy generation module 241 and finds that the amount of energy is significantly reduced, it may determine that the laundry is entangled. The energy stored in the energy storage module 242 is used during the drying course, so the induced electromotive force generated by the energy generation module 241 may be measured in real time or periodically to determine whether the laundry is entangled.

The main controller 110 may perform a laundry disentanglement course when determining that the laundry is entangled. For example, the laundry disentanglement course may be performed by repeating changing at least one of rotation speed or rotation direction. It is, however, merely an example that may be applied to the dryer 1, and the laundry disentanglement course may be performed in other various methods.

When drying of the laundry is not completed, drying of the laundry may be performed as well by activating the heater 155 and the heat pump 160 during the laundry disentanglement course.

Figure 15:
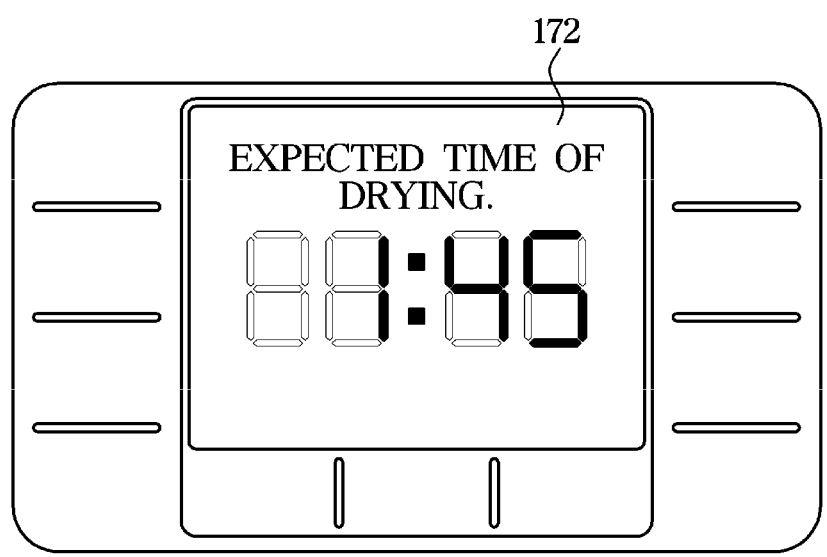
FIGS. 15 to 17 illustrate examples of information to be displayed on a display of a dryer, according to an embodiment of the disclosure.
Figure 16:
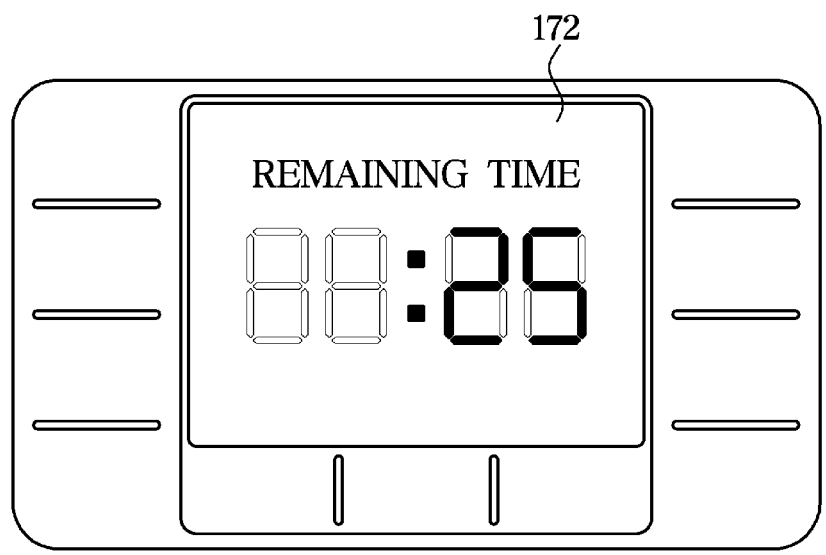
Figure 17:
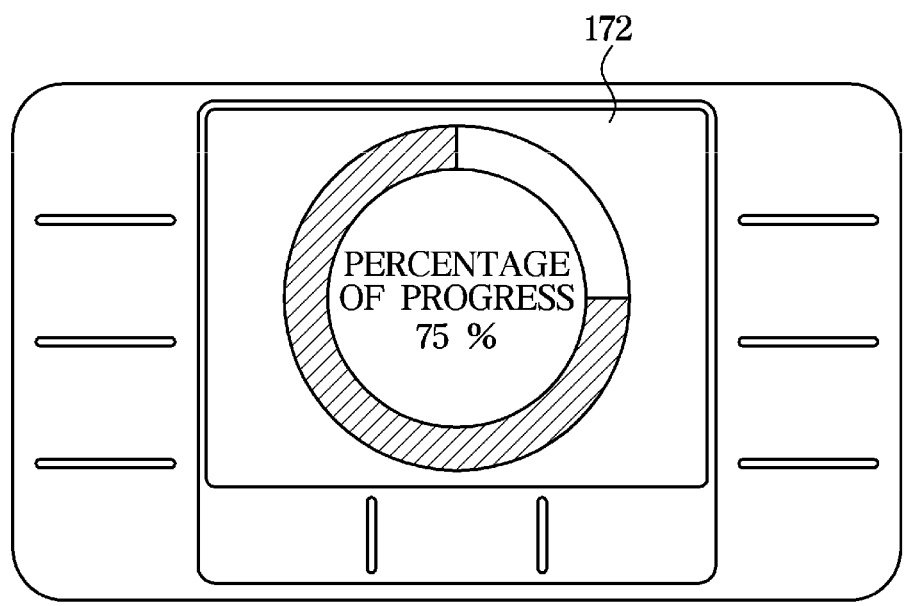

FIGS. 15 to 17 illustrate examples of information to be displayed on a display of a dryer, according to an embodiment of the disclosure.

As described above, the main controller 110 may determine a load of the laundry based on an acceleration value of the wireless sensing device 200 or an amount of energy generated based on or energy harvesting. When the dryer 1 is powered on and the drum 120 starts to rotate, the main controller 110 may determine a load of laundry based on an acceleration value of the wireless sensing device 200 or an amount of energy generated by energy harvesting, and determine expected time taken to complete drying based on the load of the laundry. The expected time determined based on the load of the laundry will now be called initial expected time.

For example, through experiments, statistics, or simulation on different loads of the laundry, the expected time taken to complete drying may be determined in advance, or a rule to calculate the expected time taken to complete drying depending on the load of laundry may be stored.

The main controller 110 may determine expected time for a current load of the laundry as the initial expected time, and control the display 172 to display the initial expected time as shown in FIG. 15.

As described above, during the drying course, the main controller 110 may receive a humidity value from the wireless sensing device 200, and when the humidity value reaches a set threshold (hereinafter, called a drying completion threshold), determine that drying of the laundry is completed. When the humidity value does not reach the drying completion threshold, the main controller 110 may calculate remaining time until completion of drying and control the display 172 to display the remaining time as shown in FIGS. 16 and 17.

For example, the main controller 110 may calculate the remaining time until completion of drying by applying the currently received humidity value and the drying completion threshold to a predefined rule. The predefined rule may be obtained by experiment, statistics or simulation.

The remaining time may be represented directly with numerical values as shown in FIG. 16, or a percentage of progress (%) indicating a ratio of current progress to the entire drying course as shown in FIG. 17. Both the numerical value and the percentage of progress may be displayed to represent the remaining time.

In the meantime, a change from a humidity value at a particular time to the drying completion threshold may not conform to a predefined rule. In this case, remaining time calculated after the particular point may be reduced much sooner or much later than an actual time. The main controller 110 may provide the user with information about the drying completion time as accurately as possible by calculating and displaying the remaining time in real time or periodically on the display 172.

The initial expected time determined based on the load of the laundry and the drying completion time determined based on the humidity value measured during the drying course may not match. The main controller 110 may continue the drying course even after the lapse of the initial expected time when the current humidity value has not reached the drying completion threshold, and finish the drying course even before the initial expected time elapses when the current humidity value has reached the drying completion threshold.

When a weight sensor for measuring weight of the laundry is equipped in the dryer 1, it is possible to estimate a load of the laundry more accurately by taking into account both a weight value output from the weight sensor and an acceleration value.

Furthermore, it is also possible to determine the initial expected time or adjust steps of the drying course by taking into account both the weight value output from the weight sensor and the acceleration value. It is generally seen that the weight and the volume of laundry are proportional to each other, but even when the laundry has a small volume, it may weigh a lot when the laundry contains much moisture. The acceleration value of the wireless sensing device 200 may be seen as reflecting the volume of the laundry. Accordingly, the more the difference between the load of the laundry based on the acceleration value and the weight value output from the weight sensor, the more wet the laundry is, so the expected time taken to complete drying the laundry may be determined to be longer. For example, the initial expected time may be determined based on the load of the laundry determined using at least one of a weight value or an acceleration value, and may be adjusted by a difference between the load of the laundry based on the acceleration value and the weight value output from the weight sensor.

There may be a case that the weight of the laundry is heavy but the volume is small or that the volume is big but the weight is light depending on material property of the laundry. The main controller 110 may determine the initial expected time by taking into account this material property. For example, the initial expected time may be determined based on the load of the laundry determined using at least one of a weight value or an acceleration value, and may be adjusted depending on the material of the laundry. A detailed adjustment method may be determined by taking into account an influence of the material of the laundry to the drying completion time, and the influence of the material of the laundry to the drying completion time may be obtained by experiment, statistics, or simulation.

A method of controlling the dryer according to an embodiment of the disclosure will now be described. The method of controlling the dryer may be implemented by using the wireless sensing device 200 and the dryer 1 including the wireless sensing device 200. Accordingly, it may be seen that what are described above in connection with FIG. 1 to 17 may also be applied in the embodiment of the method of controlling the dryer, and vice versa.

Figure 18:
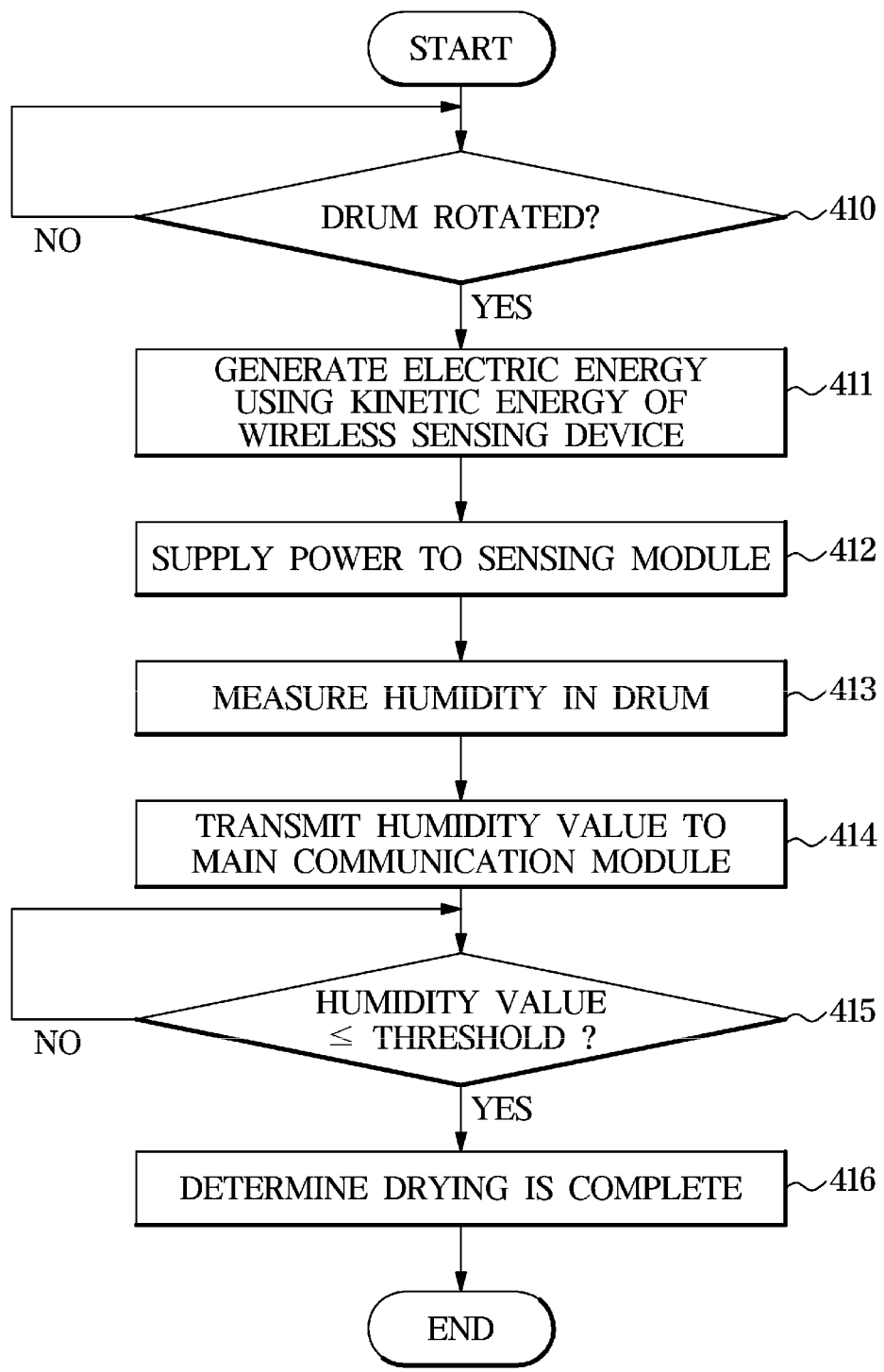
FIG. 18 illustrates a flowchart of a method of controlling a dryer, according to an embodiment of the disclosure.

FIG. 18 illustrates a flowchart of a method of controlling a dryer, according to an embodiment of the disclosure.

Referring to FIG. 18, when the drum 120 of the dryer 1 is rotated in 410, electric energy is generated using kinetic energy of the wireless sensing device 200 in operation 411, and power is supplied to the sensing module 210 in 412. The power may also be supplied to the sensor controller 220 and the sensor communication module 230.

The wireless sensing device 200 may be thrown into the drum 120 along with the laundry. When the drum 120 is rotated to dry the laundry, the wireless sensing device 200 may make free motions, such as repetition of rotation and tumbling along with the laundry in the drum 120, and the sensor power supplier 240 may generate electric energy for operation of the wireless sensing device 200 using the kinetic energy from the free motions of the wireless sensing device 200. This was described above in detail in the embodiment of the wireless sensing device 200.

Alternatively, the sensor power supplier 240 may generate the electric energy using thermal energy of hot air supplied into the drum 120.

When powered on, the sensing module 210 measures humidity in the drum in 413, and transmits a value of the humidity to the main communication module 130 of the dryer 1 in 414.

The sensing module 210 may include the humidity sensor 211. When the humidity sensor 211 measures the humidity in the drum 120, the sensor controller 220 may control the sensor communication module 230 to transmit a humidity value corresponding to the output of the humidity sensor 211 to the main communication module 130. For example, the sensing module 210 may further include the temperature sensor, and the sensor controller 220 may control the sensor communication module 230 to transmit a relative humidity value output by the humidity sensor 211 and a temperature value output by the temperature sensor 212 to the main communication module 130. Alternatively, the sensor controller 220 may calculate an absolute humidity value using the relative humidity value and the temperature value, and transmit the absolute humidity value to the main communication module 130.

When the humidity value in the drum 120 is equal to or less than a set threshold in 415, it is determined that drying is completed in 416. Once it is determined that drying is completed, the drying course may be terminated.

The main controller 110 may receive and monitor the humidity value from the wireless sensing device 200 in real time or periodically. The main controller 110 may determine that drying is completed when the humidity value in the drum 120 decreases and reaches a set threshold, i.e., when the humidity value is equal to or less than the set threshold.

Figure 19:
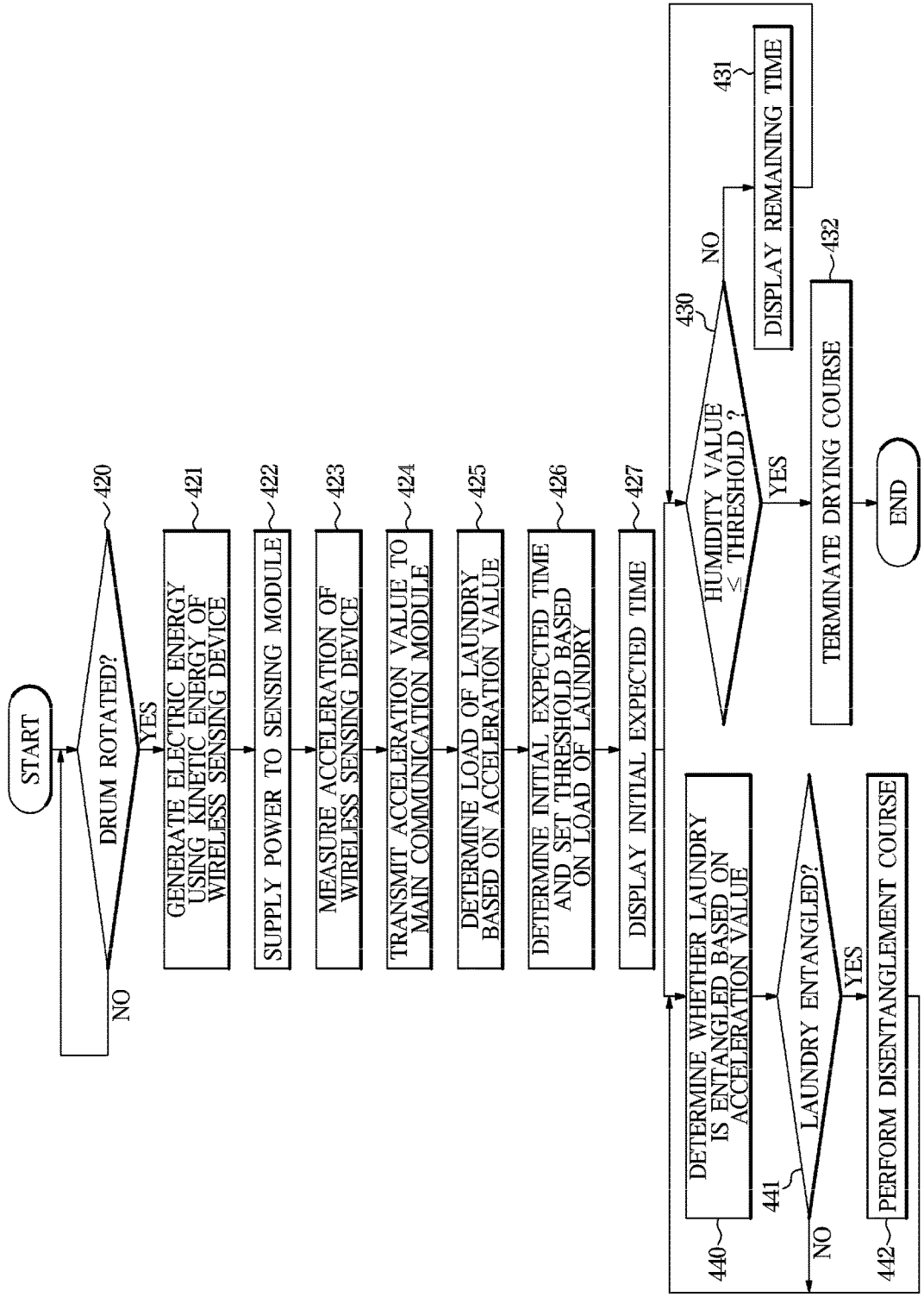
FIG. 19 illustrates another flowchart of a method of controlling a dryer, according to an embodiment of the disclosure.

FIG. 19 illustrates another flowchart of a method of controlling a dryer, according to an embodiment of the disclosure.

Referring to FIG. 19, when the drum 120 of the dryer 1 is rotated in 420, electric energy is generated using kinetic energy of the wireless sensing device 200 in operation 421, and power is supplied to the sensing module 210 in 422. The power may also be supplied to the sensor controller 220 and the sensor communication module 230.

The sensing module 210 may further include an acceleration sensor 213. When the acceleration sensor measures acceleration of the wireless sensing device 200 in 423, the sensor controller 220 transmits a value of the acceleration to the main communication module 130 through the sensor communication module 230 in 424.

The main controller 110 determines a load of the laundry based on the acceleration value in 425, and determines initial expected time to complete drying based on the load of the laundry and sets a threshold to be used in determining completion of drying in 426.

As described above, the larger the load of the laundry, the smaller the space where the wireless sensing device 200 is able to move around. Accordingly, it may be determined that the higher the acceleration, the smaller the load of the laundry, and the lower the acceleration, the larger the load of the laundry. For example, the main controller 110 may accumulate absolute values of acceleration for a certain time after start of rotation of the drum 120, and determine a load of the laundry based on the accumulated absolute value. The initial expected time may be stored for each of different loads of laundry, or rules to calculate the initial expected time for each of the different loads of laundry may be stored. The determined initial expected time is displayed on the display 172, in 427.

As described above with reference to the flowchart of FIG. 18, when the humidity value in the drum 120 reaches the set threshold, it may be determined that drying is completed. However, humidity may differ by the load of laundry at a drying completion time, so the main controller 110 may set a threshold to be used in determining the drying completion time based on a load of the laundry. For example, the larger the load of the laundry, the higher the threshold may be set.

The main controller 110 may determine the drying completion time while continuously monitoring the humidity value. When a current humidity value is equal to or less than the set threshold in 430, it is determined that drying is completed and the drying course is terminated in 432; when the current humidity value exceeds the set threshold in 430, remaining time until completion of drying is displayed on the display 172 in 431. Calculation and display of the remaining time were described above with reference with FIGS. 16 and 17.

The main controller 110 determines whether the laundry is entangled based on the acceleration value while monitoring both the humidity value and the acceleration value, in 440. For example, the main controller 110 may determine that the laundry is entangled when an amount of acceleration change is reduced by a set threshold or more, i.e., when a reduction in the amount of acceleration change is equal to or greater than the threshold, When it is determined that the laundry is entangled in 441, the main controller 110 performs a laundry disentanglement course in 442. Furthermore, the main controller 110 may keep on monitoring the acceleration value even after performing the laundry disentanglement course, and perform the laundry disentanglement course again when the laundry becomes entangled again.

Determining the load of the laundry or whether the laundry is entangled may be based on an amount of energy generated by energy harvesting. How to determine the load of the laundry or whether the laundry is entangled based on an amount of energy generated was described above in an embodiment of the dryer 1 and the wireless sensing device 200.

When the current humidity value reaches a drying completion threshold, the drying course may be terminated even when it is determined that the laundry is entangled, or when the current humidity value reaches the drying completion threshold but it is determined that the laundry is entangled, the drying course may not be terminated until the laundry disentanglement course is completed. Alternatively, the drum 120 may keep operating while operations of the heat pump 160 and the heater 155 are stopped.

According to the aforementioned wireless sensing device, dryer, and method for controlling the dryer, the wireless sensing device 200 physically separated from the dryer 1 and moving around along with the laundry in the drum 120 is used to measure humidity in the drum 120, thereby increasing accuracy and reliability in measurement of the humidity.

Furthermore, using kinetic energy generated by motions of the wireless sensing device 200 or thermal energy supplied to the drum 120, the wireless sensing device 200 creates its own electric energy and thus, does not need to receive power from the dryer 1.

Moreover, a load of laundry may be estimated using acceleration of the wireless sensing device 200 moving around along with the laundry in the drum 120, so that a load of the laundry may be estimated even without an extra weight sensor for measuring the load of the laundry, or the load of the laundry may be estimated more accurately by taking into account both the acceleration and a value from a weight sensor when the weight sensor is equipped therein. Further, accuracy in determining completion of drying may be improved by setting a threshold to be used in determining the completion of drying based on the estimated load of the laundry.

In addition, using the acceleration of the wireless sensing device 200 moving around along with the laundry in the drum 120, whether the laundry is entangled may be determined. That is, the measured acceleration may be variously used.

According to the disclosure, a wireless sensing device may be thrown into a drum along with laundry to accurately measure humidity in the drum, and a dryer and method of controlling the dryer may have increased accuracy in controlling the timing of stopping a drying course by determining a degree of dryness based on the humidity measured by the wireless sensing device.

The above description illustrates the disclosure. Embodiments of the disclosure are described above, and the disclosure may be used in other various combinations and alterations of the embodiments, and environments. The disclosure may be changed or modified within a range equivalent to what is described above and/or a range of technologies or knowledge of ordinary skill in the art.

Several embodiments of the disclosure have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A dryer comprising:
    a drum;
    a wireless sensing device disposed in the drum and comprising:
        a sensing module including a humidity sensor configured to measure humidity in the drum,
        a sensor communication module configured to transmit or receive data through wireless communication,
        a sensor controller configured to control the sensor communication module to transmit a humidity value corresponding to an output of the humidity sensor, and
        a sensor power supplier configured to supply power to the sensing module, the sensor communication module, and the sensor controller;
    a main communication module configured to receive the humidity value from the wireless sensing device; and
    a main controller configured to determine that drying is completed in response to the humidity value being equal to or less than a set threshold, the main controller further configured to determine a weight or a volume of a load of laundry contained in the drum or whether the laundry is entangled based on an amount of electric energy generated by the sensor power supplier.

2. The dryer of claim 1, wherein:
    the sensing module comprises an acceleration sensor, and
    the sensor controller is configured to control the sensor communication module to transmit an acceleration value corresponding to an output of the acceleration sensor.

3. The dryer of claim 2, wherein the main controller is configured to determine the weight or the volume of the load of laundry contained in the drum based on the acceleration value.

4. The dryer of claim 3, further comprising a display, wherein the main controller is further configured to:
    determine an initial expected time taken to complete drying of the laundry based on the weight or the volume of the load of the laundry, and
    control the display to display the initial expected time.

5. The dryer of claim 4, wherein the main controller is further configured to:
    determine a remaining time of drying based on a current humidity value received from the wireless sensing device and the set threshold; and
    control the display to display the remaining time of drying.

6. The dryer of claim 2, wherein the main controller is further configured to:
    determine whether laundry contained in the drum is entangled based on the acceleration value; and
    when it is determined that the laundry is entangled, perform a laundry disentanglement course.

7. The dryer of claim 6, wherein the main controller is further configured to determine that the laundry is entangled when an amount of change in the acceleration value is reduced by a set threshold or more.

8. The dryer of claim 1, wherein the sensor power supplier is configured to use kinetic energy of the wireless sensing device rotating, free falling, or tumbling in the drum to generate the electric energy while the drum rotates.

9. A wireless sensing device comprising:
    a sensing module including a humidity sensor configured to measure humidity in a drum of a dryer into which the wireless sensing device is disposed;
    a sensor communication module configured to transmit or receive data with a main communication module of the dryer through wireless communication;
    a sensor controller configured to control the sensor communication module to transmit a humidity value corresponding to an output of the sensing module to the main communication module;
    a sensor power supplier configured to supply power to the sensing module, the sensor communication module, and the sensor controller; and
    a main controller configured to determine a weight or a volume of a load of laundry contained in the drum or whether the laundry is entangled based on an amount of electric energy generated by the sensor power supplier.

10. The wireless sensing device of claim 9, wherein the sensor power supplier comprises:
    an energy generation module configured to generate the electric energy using energy harvesting; and
    an energy storage module configured to store the electric energy.

11. The wireless sensing device of claim 10, wherein the energy generation module uses at least one of an electromagnetic induction method, a triboelectrification method, piezoelectric method, or thermoelectric method to generate the electric energy.

12. The wireless sensing device of claim 10, wherein the energy generation module uses kinetic energy of the wireless sensing device rotating, free falling, or tumbling in the drum to generate the electric energy while the drum rotates.

13. The wireless sensing device of claim 12, wherein the energy generation module comprises a coil and a magnet configured to be movable around the coil due to rotation of the drum,
    wherein the energy generation module stores electromotive force generated when the magnet is moving inside the coil as the wireless sensing device rotates, free-falls, or tumbles due to rotation of the drum.

* * * * *